United States Patent
Hulse et al.

(10) Patent No.: US 9,616,811 B2
(45) Date of Patent: Apr. 11, 2017

(54) EMERGENCY VEHICLE LIGHT FIXTURE WITH REFLECTIVE SURFACE HAVING ALTERNATING LINEAR AND REVOLVED PARABOLIC SEGMENTS

(71) Applicant: Emergency Technology, Inc., Hudsonville, MI (US)

(72) Inventors: George Hulse, Hudsonville, MI (US); Edward T. Schneider, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 67 days.

(21) Appl. No.: 14/414,193

(22) PCT Filed: Jul. 10, 2013

(86) PCT No.: PCT/US2013/049892
§ 371 (c)(1),
(2) Date: Jan. 12, 2015

(87) PCT Pub. No.: WO2014/011748
PCT Pub. Date: Jan. 16, 2014

(65) Prior Publication Data
US 2015/0210209 A1 Jul. 30, 2015

Related U.S. Application Data

(60) Provisional application No. 61/669,834, filed on Jul. 10, 2012.

(51) Int. Cl.
*B60Q 1/52* (2006.01)
*B60Q 1/26* (2006.01)
(Continued)

(52) U.S. Cl.
CPC .............. *B60Q 1/52* (2013.01); *B60Q 1/2611* (2013.01); *F21S 48/215* (2013.01);
(Continued)

(58) Field of Classification Search
CPC ......... F21S 48/234; F21S 48/215; F21V 7/09; F21V 7/04; F21V 7/048; F21V 7/0083;
(Continued)

(56) References Cited

U.S. PATENT DOCUMENTS

| 5,136,483 A | 8/1992 | Schoniger et al. |
| 5,418,384 A | 5/1995 | Yamana et al. |

(Continued)

FOREIGN PATENT DOCUMENTS

| DE | 102009009765 A1 * | 8/2010 | ............ F21S 48/215 |
| EP | 1077344 A2 | 2/2001 | |

(Continued)

OTHER PUBLICATIONS

Kim Do Weon, International Search Report, Sep. 30, 2013, 3 pages, Korean Intellectual Property Office, Republic of Korea.

*Primary Examiner* — Robert May
(74) *Attorney, Agent, or Firm* — McGarry Bair

(57) ABSTRACT

An emergency vehicle light fixture includes, among other things, an elongated body having a reflective surface formed by a series of alternating linear and revolved parabolic segments. The series of alternating linear and revolved parabolic segments are coextensive along the height of the reflective surface and have an optical axis. Each of the alternating linear and revolved parabolic segments has a focal point that lies along a common axis that is orthogonal to the optical axis.

23 Claims, 20 Drawing Sheets

(51) Int. Cl.
  *F21S 8/10*  (2006.01)
  *F21V 14/04* (2006.01)
  *F21W 101/00* (2006.01)
  *F21Y 101/00* (2016.01)

(52) U.S. Cl.
  CPC ............ *F21S 48/234* (2013.01); *F21V 14/04* (2013.01); *F21W 2101/00* (2013.01); *F21Y 2101/00* (2013.01)

(58) Field of Classification Search
  CPC . F21V 14/04; F21V 7/005; F21V 7/06; F21Y 2103/003; B60Q 1/52
  See application file for complete search history.

(56) References Cited

U.S. PATENT DOCUMENTS

| | | |
|---|---|---|
| 5,471,371 A | 11/1995 | Koppolu et al. |
| 5,704,709 A | 1/1998 | Zwick et al. |
| 5,813,753 A | 9/1998 | Vriens et al. |
| 5,816,693 A | 10/1998 | Winston et al. |
| 5,887,968 A | 3/1999 | Logan |
| 6,158,882 A | 12/2000 | Bischoff, Jr. |
| 6,257,737 B1 | 7/2001 | Marshall et al. |
| 6,318,886 B1 | 11/2001 | Stop et al. |
| 6,320,182 B1 | 11/2001 | Hubble, III et al. |
| 6,481,130 B1 | 11/2002 | Wu |
| 6,527,411 B1 | 3/2003 | Sayers |
| 6,641,284 B2 | 11/2003 | Stopa et al. |
| 6,705,746 B2 * | 3/2004 | Perlo ...................... F21S 2/005 362/290 |
| 6,945,672 B2 | 9/2005 | Du et al. |
| 7,008,079 B2 | 3/2006 | Smith |
| 7,455,438 B2 | 11/2008 | Repetto et al. |
| 7,513,642 B2 | 4/2009 | Sormani |
| 7,553,054 B2 | 6/2009 | Yagi |
| 7,578,600 B2 | 8/2009 | Czajkowski |
| 7,744,225 B2 | 6/2010 | Suzuki |
| 8,197,105 B2 * | 6/2012 | Yang ...................... A47F 3/001 362/217.05 |
| 8,721,131 B2 * | 5/2014 | Miyairi ................. F21V 7/0008 362/217.05 |
| 8,807,789 B2 * | 8/2014 | Peck ........................ F21V 7/04 362/235 |
| 9,052,083 B2 * | 6/2015 | Stein .................... B60Q 1/2611 |
| 2002/0118548 A1 | 8/2002 | Kuenstler et al. |
| 2003/0039121 A1 | 2/2003 | Nezigane |
| 2004/0070991 A1 | 4/2004 | Agabekov et al. |
| 2006/0291201 A1 | 12/2006 | Smith |
| 2007/0153530 A1 | 7/2007 | Czajkowski |
| 2009/0303716 A1 | 12/2009 | Czajkowski |
| 2010/0110677 A1 | 5/2010 | Stein |
| 2011/0051394 A1 | 3/2011 | Bailey |
| 2011/0080728 A1 | 4/2011 | Nakagawa et al. |
| 2011/0255277 A1 | 10/2011 | Dassanayake et al. |

FOREIGN PATENT DOCUMENTS

| | | |
|---|---|---|
| EP | 1026032 A3 | 4/2002 |
| JP | 2011028979 A | 2/2011 |
| KR | 1020100115864 A | 10/2010 |
| WO | 2007040527 A1 | 4/2007 |

* cited by examiner

EMERGENCY VEHICLE LIGHT FIXTURE WITH REFLECTIVE SURFACE HAVING ALTERNATING LINEAR AND REVOLVED PARABOLIC SEGMENTS

CROSS-REFERENCE TO RELATED APPLICATIONS

This application is a National Phase application of International Application No. PCT/US2013/049892, filed Jul. 10, 2013, which claims the benefit of U.S. Provisional Application Ser. No. 61/669,834 filed Jul. 10, 2012, which is incorporated herein by reference in its entirety.

BACKGROUND

This invention relates to lighting and illumination fixtures for emergency vehicles. In one of its aspects, the invention relates to a light bar fixture with multiple LED light sources and a reflector to project directional light. In another of its aspects, the invention relates to a light assembly of one or more reflectors for a light bar fixture.

Stopa et al. U.S. Pat. No. 6,641,284 discloses an LED light assembly that includes a parabolic reflector and a linear array of LEDs arranged on the focal axis of the reflector. An optional collimating lens is arranged in front of the reflector to collimate the light emitted from the reflector at less than a predetermine angle so that the light emitted by the LEDs either passes through the lens or is otherwise reflected from the reflector. A substantially collimated beam of light is said to form a band extending the longitudinal span of the reflector Czajkowski U.S. Pat. No. 7,578,600 discloses a light assembly which can include an LED array and a reflector that has a central portion and a pair of end portions. The LED array includes LEDs which are positioned to define a focal axis and which emit light substantially along an optical output axis that is perpendicular to the focal axis. The optical output axis of the LED array can be disposed in an intersecting relationship with the reflector surface. The reflector can be defined by a curved section defined with respect to a principal axis. Each portion of the reflector has two or more sections, each of which is defined by a different mathematical equation. In one iteration, a reflector is formed from a composite of adjacent parabolic curve sections, each having a principle axis that is perpendicular to the optical output axis LEDs in front of the curved sections. Czajkowski US20070153530 discloses to a reflector which includes a linear curved section which may be defined by a parabolic equation and a plurality of parabolic sections which are positioned at the bottom part of the reflector. In addition, end reflectors are planar and are perpendicular to the back wall of the reflector. LEDs are mounted at the focal axis of parabolic sections and the parabolic sections are configured to direct a portion of the light from the LEDs to the center or H-V point of the beam pattern. The output axis of each LED is vertical and is thus perpendicular to the principal axis of the reflective surface.

SUMMARY OF INVENTION

According to the invention, an emergency vehicle light fixture comprising an elongated body having an optical axis and a continuous reflective surface formed by a series of alternating linear and revolved parabolic segments that are coextensive along the height of the reflective surface, each of which has a focal point that lies along a common axis that is orthogonal to the optical axis, wherein the elongated body extends parallel to the common axis, and wherein the alternating linear and revolved parabolic segments are joined at edges and alternated in a direction parallel to the common axis.

In one embodiment, the emergency vehicle light fixture further comprises an LED positioned at the focal point of one or more of the revolved parabolic segments. The revolved parabolic segments may be concave or convex with respect to the optical axis in orthogonal cross-section.

The emergency vehicle light fixture may further comprise revolved end reflector segments that flank the series of linear and revolved reflector segments. LEDs may be positioned at each of the focal points of the revolved end reflector segments.

The revolved parabolic segments may be defined by partial revolution of a line around the optical axis and then projected orthogonally to the optical and common axis onto a curve that is defined by a parabolic function. The the focus of the curve is preferably located at the intersection of the optical and common axes. Thus, each normal cross section through a revolved parabolic segment will be a curve with a common radius of curvature.

The revolved parabolic segments may be defined by a parabolic curve that modulated along the length thereof with a complex function such as a sinusoidal function. The complex function may be convex. Alternatively, the complex function may be concave. The sinusoidal function of at least some of the revolved parabolic segments may be convex along a portion of at least one of the revolved parabolic segments and concave along another portion of at least some of the revolved parabolic segments.

The linear parabolic segments may be linear with respect to the optical axis in orthogonal cross-section.

According to yet another embodiment, the emergency vehicle light fixture further comprises an LED positioned at the focal point of one or more linear and revolved parabolic segments wherein the output axis of the LEDs are positioned at an acute angle with respect to the axis orthogonal to the common axis and the optical axis. The acute angle may be greater than 0 degrees and less than 15 degrees. Alternatively, the acute angle may be greater than 8 degrees and less than 12 degrees. Alternatively, the acute angle may be about 10 degrees.

The linear and revolved parabolic segments may have a common parabolic function. The common parabolic function may be aspheric or conic. The parabolic function may be modulated with a sinusoidal or other complex function.

The emergency vehicle light fixture may further comprise revolved end reflector segments that flank the series of linear and revolved reflector segments. The revolved end reflector segments may comprise a series of reflector segments that are defined by rotating a parabolic curve about a common point at the intersection of the end reflector segments.

The emergency vehicle light fixture may further comprise an LED positioned at the focal point of one or more linear and revolved parabolic segments and further comprise an optical element that is positioned and configured to direct light rays emanating from the LED and not reflected by the reflective surface of the light fixture.

In yet another embodiment of the emergency vehicle light fixture, the parabolic surfaces form a mirror-symmetrical curve with respect to the optical axis.

DETAILED DESCRIPTION

Figure 1:
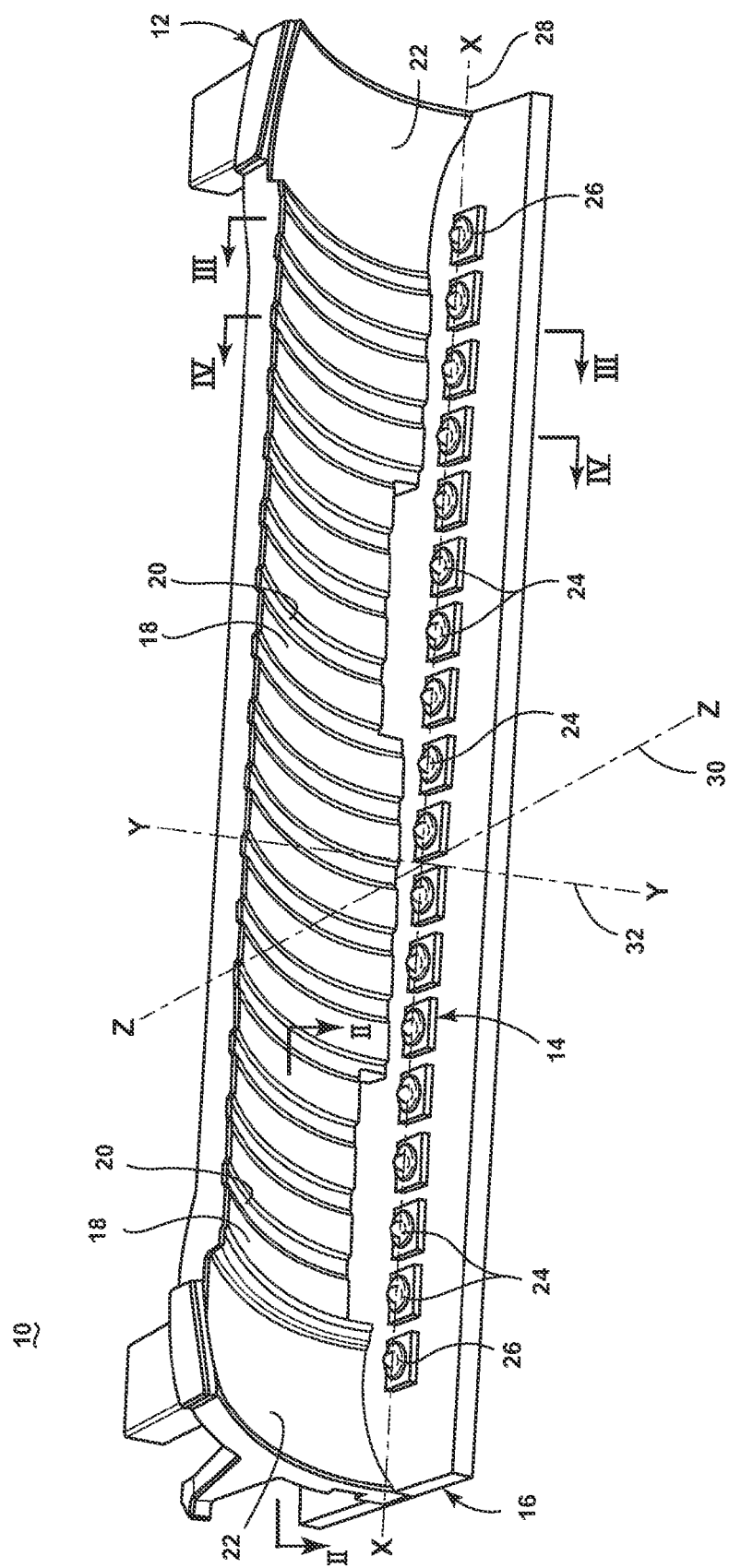
FIG. 1 is a perspective view of an embodiment of a light assembly according to the present invention.

An embodiment of a light assembly 10 according to the present invention is shown in FIG. 1. The light assembly 10 comprises a reflector array 12, an LED array 14 and supporting structures upon which the reflector array and LED are integrated including the base 16 upon which they are mounted. The reflector array 12 of FIG. 1 comprises a highly reflective material that is adhered to the surface of the reflector array 12 facing the LED array 14. The profile of the reflective face of the reflector array 12 comprises alternating segments of revolved 18 and linear 20 surfaces that are flanked by revolved segments 22. The LED array 14 includes a plurality of interior LEDs 24 flanked by an LED 26 at either end.

As shown in FIG. 1, the LED array 14 is aligned in a linear distribution of 18 LEDs evenly spaced along the horizontal axis 28, herein referred to as the X-axis that is perpendicular to the optical axis 30 of the reflector array 12, herein referred to as the Z-axis. Other embodiments may include a different number of LEDs. The distribution of the LEDs 24, 26 in the LED array 14 may also be curvilinear. Depending upon the embodiment of the light assembly 10, the flanking LEDs 26 can be offset from the LED array 14 distribution.

Figure 2:
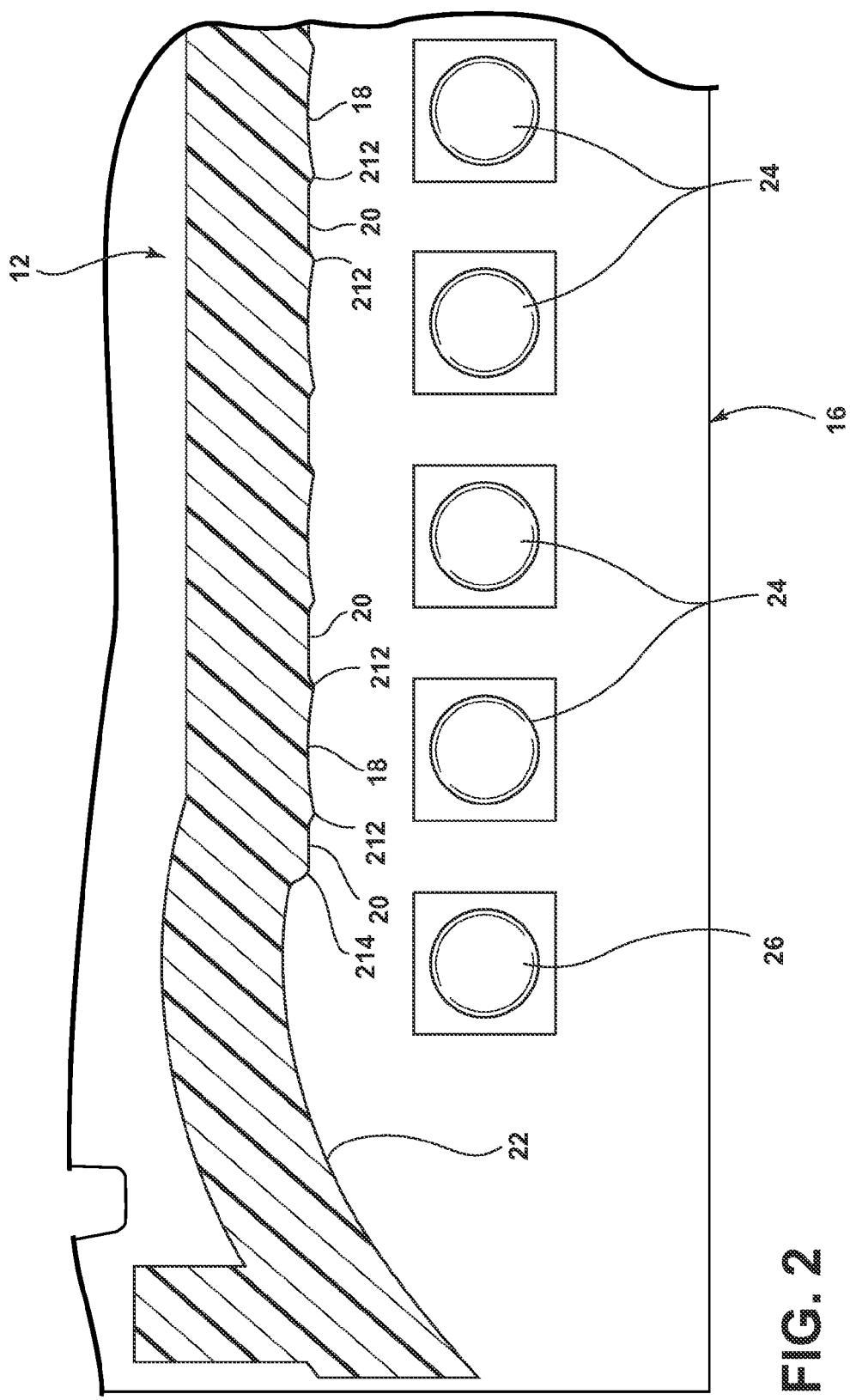
FIG. 2 is a partial horizontal cross-sectional view of the light assembly of FIG. 1 taken along the line II-II through the reflector assembly.

FIG. 2 is a partial horizontal cross-sectional view of the light assembly 10 of FIG. 1 taken through line II-II. The end reflector segment 22 is joined to a linear reflector segment 20 at a chamfered or filleted edge 214. The alternating interior reflector segments 18, 20 are also joined by chamfered or filleted edges 212. Each revolved interior reflector segment 18 is defined by a facet that is formed by partial revolution of a line around the Z-axis 30 and then projected orthogonally in the direction of the Y-axis 32 onto a curve that is defined by a parabolic function that preferably has its origin at the intersection of the Y-Z axes and the focal point on the X-axis, thus defining a curved horizontal profile with a focus of the effective output of an LED 24. By placing the LEDs 24 at the focal point of the revolved segments 18, the revolved segments collect light from the LEDs 24 and direct it along the Z-axis 30. Each linear interior reflector segment 20 as shown in FIG. 2 is defined by a parabolic curve that is projected along the X-axis and thus has a linear horizontal profile that is parallel to the X-axis 28. The linear segments direct light from the LEDs 24 radially out from the Z-axis 30.

Figure 19:
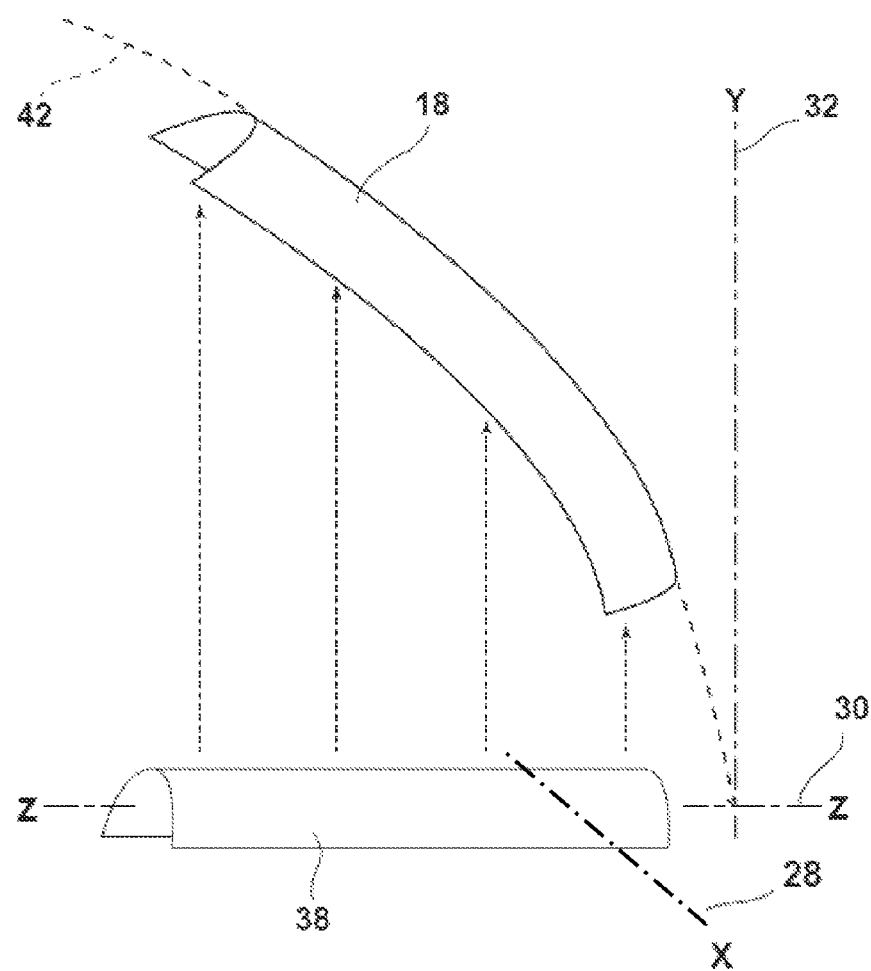
FIG. 19 is a diagrammatic view of a revolved section of the reflector, illustrating the geometry of a concave revolved section according to the invention.

Referring now to FIG. 19, the revolved segments 18 are formed as a concave downward facet 38 that is formed by partial revolution of a line around the Z-axis 30. The concave downward facet 38 is then projected orthogonally in the direction of the Y-axis 32 onto a curve that is defined by a parabolic function 42 that preferably has its origin at the intersection of the Y-Z axes with the focus of the curve located at the intersection of the Z and X-axes 30, 28, respectively. The upward projection of the segment 18 thus has a curvature that is defined by a function that imparts a curvature to the shape of the facet in the YZ plane. As shown, the revolved segment 18 follows a parabolic function 42 in a vertical profile. The revolved segment 18 can be formed by projecting the curved facet 38 onto a curve of any aspheric function to define the vertical profile.

Figure 3:
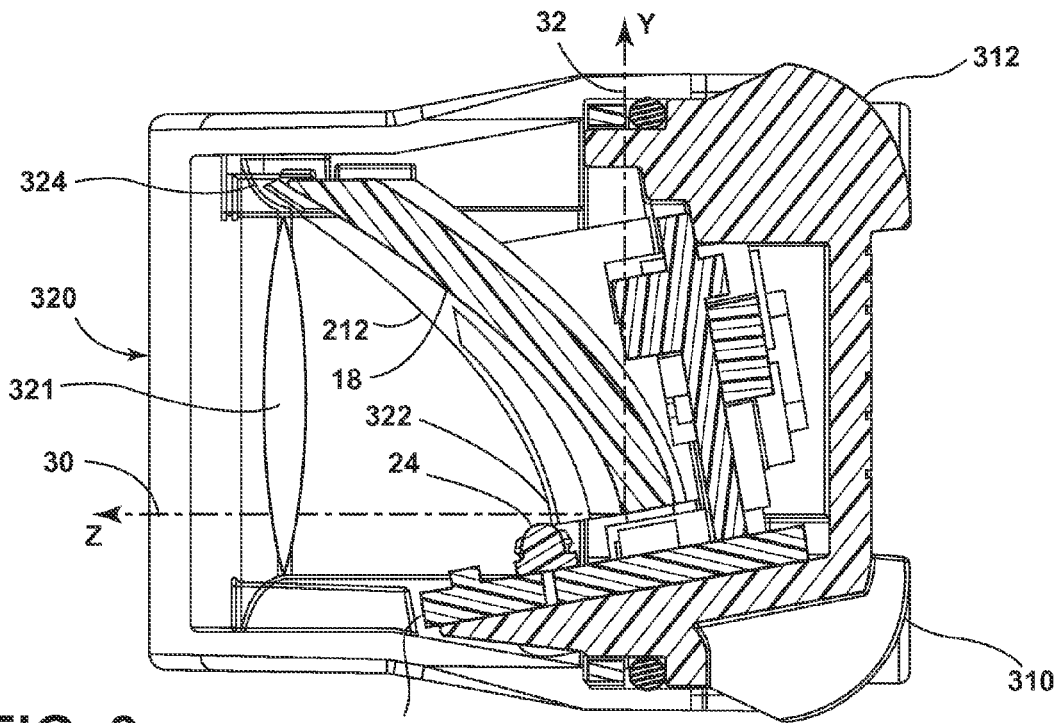
FIG. 3 is a vertical cross-sectional view of the light assembly of FIG. 1 positioned in a fixture housing and taken along the line III-III through a revolved reflector segment.
Figure 4:
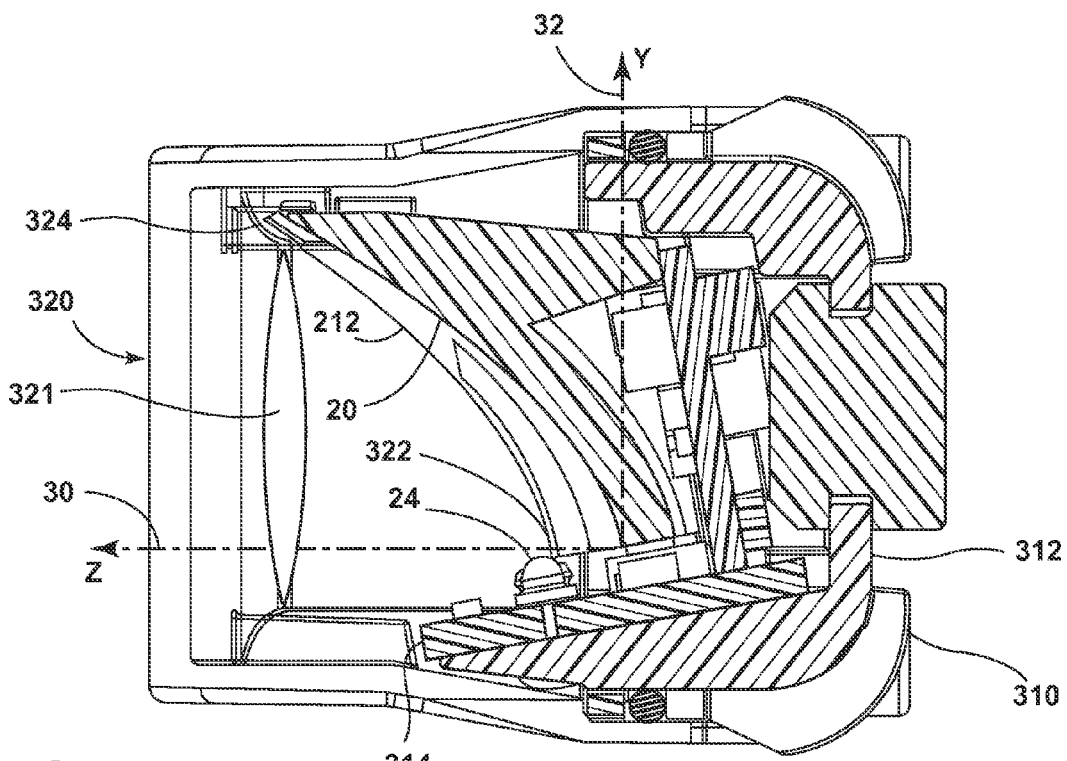
FIG. 4 is a vertical cross-sectional view of the light assembly of FIG. 1 positioned in a fixture housing and taken along the line IV-IV through an linear reflector segment.

The configuration of the light assembly 10 integrated into the transparent front 320 and rear housing elements 312 can be seen in vertical cross-section along lines III-III and IV-IV of FIG. 1 in FIGS. 3 and 4. As shown in FIGS. 3 and 4, the LEDs 24 can be inclined from the Y-axis 32; that is, the axis that is orthogonal to the plane formed as the intersection of the X-axis 28 and the Z-axis 30. That is, the output axis of the LEDs 24 may be positioned at an acute angle with respect to the axis orthogonal to the common axis (or X-axis 28) and the optical axis (or Z-axis 30). The flanking LEDs 26 can also be inclined. The inclination can range from 0 to 15 degrees where the axis of rotation is the X-axis 28 and the plane of rotation is both parallel to the plane formed as the intersection of the Z-axis 30 and the Y-axis 32 and bisects the LED 24, 26. The acute angle may be greater than 0 degrees and less than 15 degrees. Alternatively, the acute angle may be greater than 8 degrees and less than 12 degrees. Alternatively, the acute angle may be about 10 degrees as embodied for the LEDs 24 in FIGS. 3 and 4. The LEDs 24 may be inclined to any angle depending upon the implementation. The components 310, 312, 314 of the light assembly base 16 are configured to offset the output axis of the LEDs 24 from the Y-axis 32.

The revolved reflector segments 18 shown in FIG. 3 and the linear reflector segments 20 shown in FIG. 4 extend vertically along the Y-axis 32 in a parabolic profile. The focus of the parabolic surfaces is located on the X-axis 28. As previously established in FIG. 1, the LED array 14 is also located on the X-axis 28. The consequence of collocating the LED array 14 and the focus of the revolved reflector segments 18 is to collimate the emitted output by each LED 24 into a direction substantially along the Z-axis. The linear segments 20 direct light away from the Z-axis 30.

Each alternating revolved and linear segment are joined by a chamfered or filleted edge 212 as shown in vertical profile in FIGS. 3 and 4. As a consequence of joining the revolved and linear segments 18, 20 at their upper edge 324, the chamfered or filleted edges 212 have a surface profile that relaxes from strictly parabolic at its lower edge 322 to its upper edge 324. The chamfered or filleted edges that result as a natural consequence of the manufacturing process have a diffusive effect on the distribution of the light intensity. Distributing light in many directions is desirable because it makes the light assembly visible from more viewing angles.

Additionally, the light assembly 10 may include an optical element 321 that is positioned and configured to direct light rays emanating from the LED. The position and configuration of the optical element 321 is preferably selected to direct light that has not been reflected by the reflective surface of the light assembly. That is, the optical element 321 may redirect light emanating from an LED that would not be reflected by the reflective surface of the light assembly. The optical element 321 may configured to gather light directly from the LEDs 24 or from the reflective surface of the light assembly. Additional considerations that effect the particular position and configuration of the optical element 321 may include redirecting light rays reflected from the reflective surface of the light assembly to effect a desired distribution of the light intensity. Additional optical elements may be provided on the inner surface of the outer lens housing 320. Example optical elements may include, but not be limited to, a collimating lens, a holographic element and a diffractive element.

Figure 5:
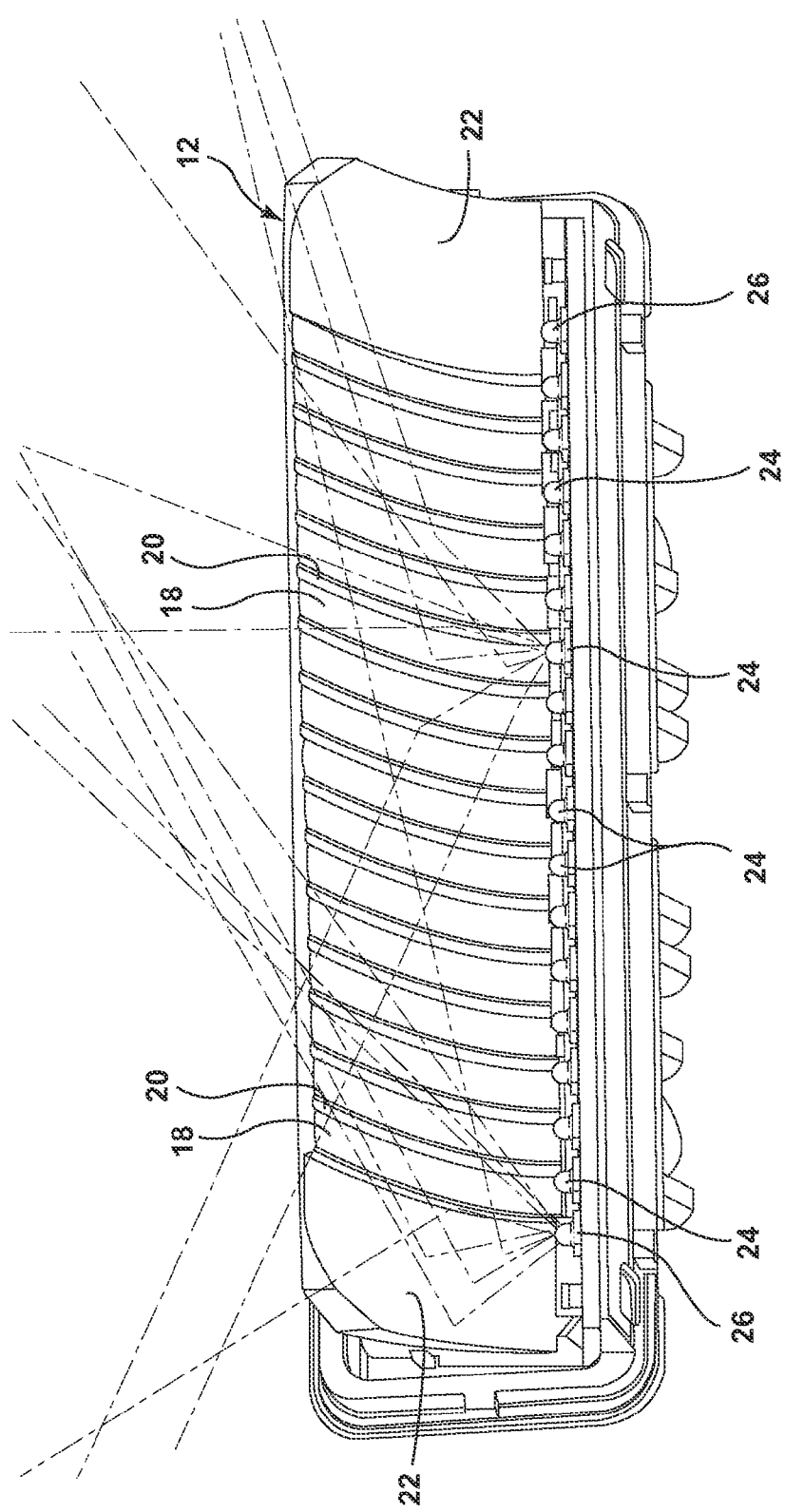
FIG. 5 is a perspective view of the light assembly of FIG. 1 including a ray-traced representation of light emitted from two LED's interacting with the light assembly.

The light intensity output of the light assembly 10 is dependent upon the relative placement of the LED array 14, the reflector array 12 and its constituent reflective elements 18, 20, 22, 212, 214. A common method for determining performance of an optical system is to model the system in a computer with a geometrical ray-tracing program. Geometrical ray tracing for optical design is used to describe the propagation of light rays through an optical system like the light assembly 10. Ray trace modeling provides a simulation technique that predicts the effective light output and performance of an optical system. FIG. 5 is a perspective view of the light assembly of FIG. 1 that includes a representation of the geometrical ray tracing for a simulation where two LEDs 24 are active and illuminating for the light assembly 10.

Figure 6:
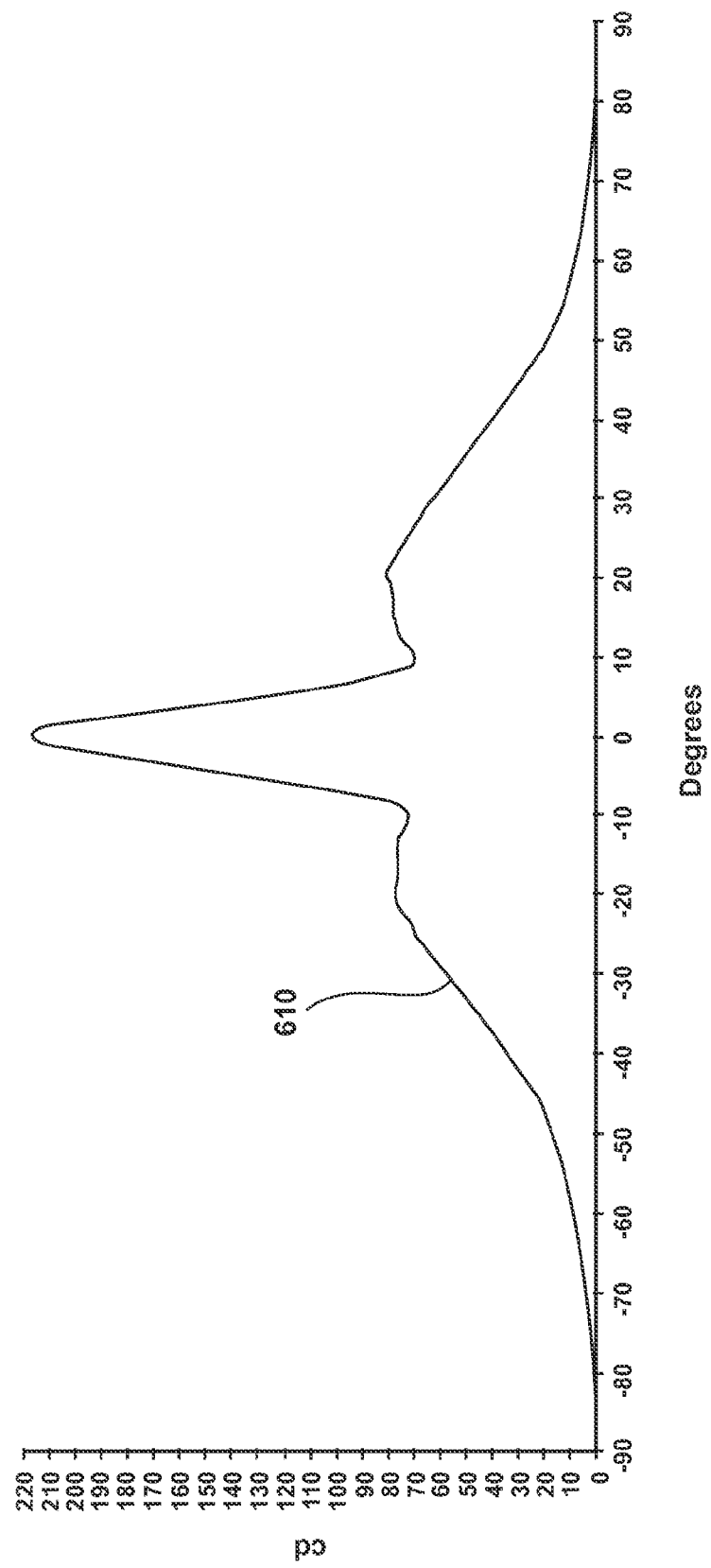
FIG. 6 is a candela distribution of the output in the horizontal plane of the single active interior LED in the light assembly of FIG. 5.

The light intensity pattern of a single interior LED 24 at the output of the reflector assembly 12 is represented by the candela distribution plot in FIG. 6. The curve 610 represents the angular distribution of light intensity aligned with the horizontal structure of the reflector assembly 12. This curve 610 shows that the reflector system illuminates a bright spot of light along the optical axis and spreads light radially out from the Z-axis 30.

Figure 7:
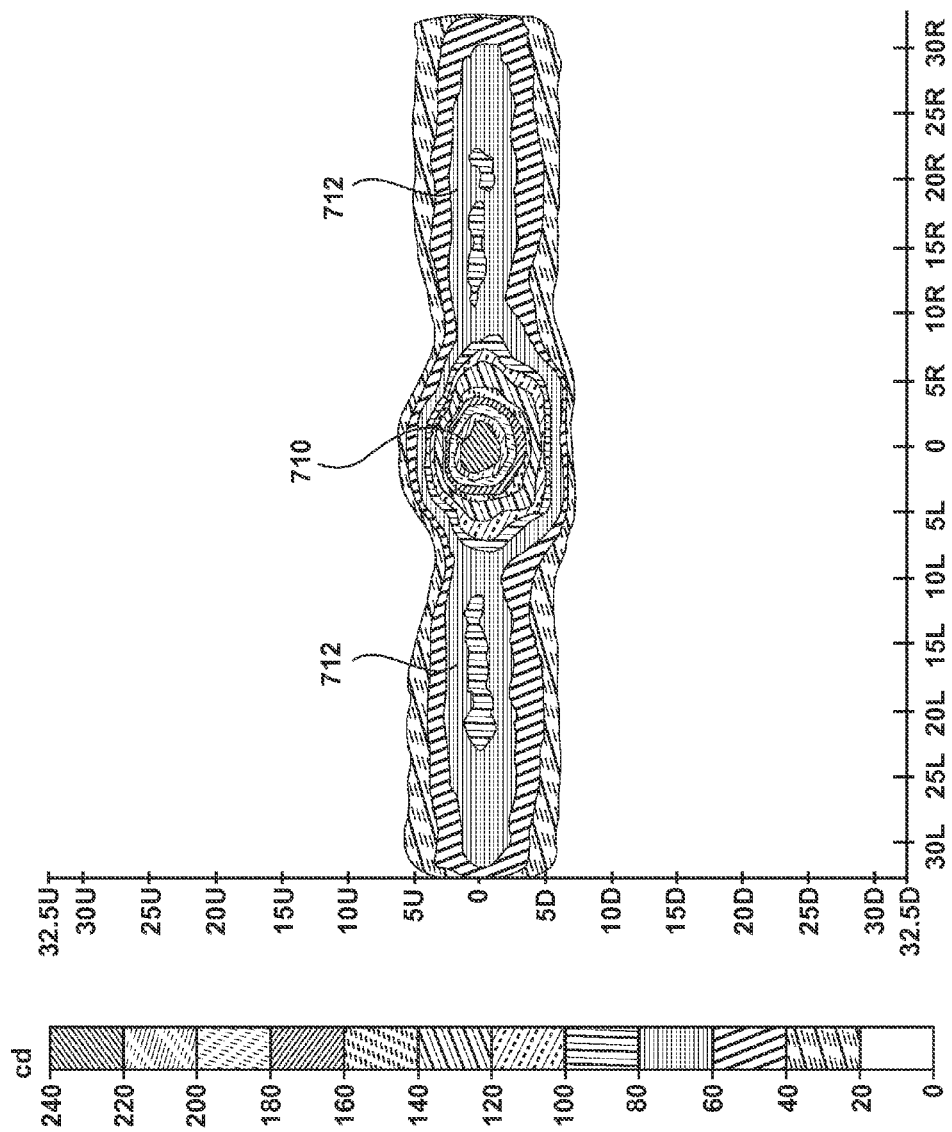
FIG. 7 is an isocandela plot of the output of the single active interior LED in the light assembly of FIG. 5.

The profile and placement of the alternating segments of the reflector 18, 20 control the spreading and focusing of light intensity. The linear segments 20 direct light substantially off of the Z-axis 30. The revolved segments 18 direct light along the Z-axis 30. The overall effect of the reflector assembly 12 is to produce an illumination pattern that is substantially constrained vertically and substantially directed horizontally. An isocandela plot as in FIG. 7 graphically represents the pattern of the light output from the single interior LED 24 illuminating through the reflector assembly 12. Not to be confused with an intensity image of the light assembly, the isocandela plot is a graphical representation of the distribution of light intensity output from the assembly for a specific angular position of a detector. The isocandela plot demonstrates a strong central intensity 710 on the optical axis and a horizontal dispersion 712 indicative of the focal line contributions of the linear reflector segments 20. This is a desirable characteristic because it makes the light assembly 10 visible for a viewer located off of the Z-axis 30 on the plane determined by the Z-axis 30 and the X-axis 28.

Figure 8:
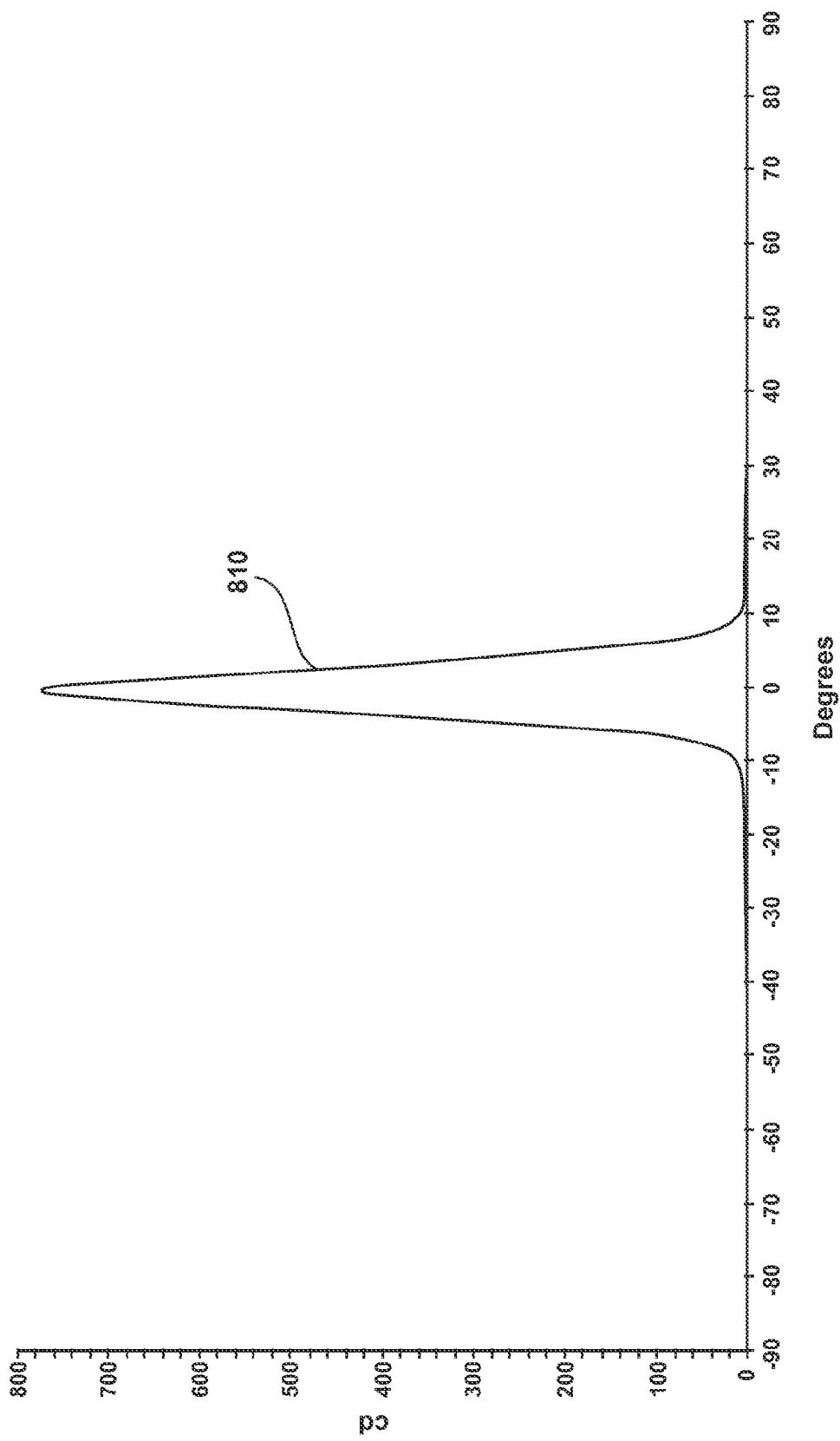
FIG. 8 is a candela distribution of the output in the horizontal plane of the single active flanking LED and the end reflector in the light assembly of FIG. 5.

The light intensity pattern of a single exterior LED 512 at the output of the reflector assembly 12 is represented by the candela distribution plot in FIG. 8. The curve 810 represents the angular distribution of light intensity aligned with the horizontal structure of the reflector assembly 12. This curve 810 shows that the end reflector segment 22 substantially illuminates a bright spot of light along the optical axis; spreading light minimally out in a radial fashion from the Z-axis 30.

Figure 9:
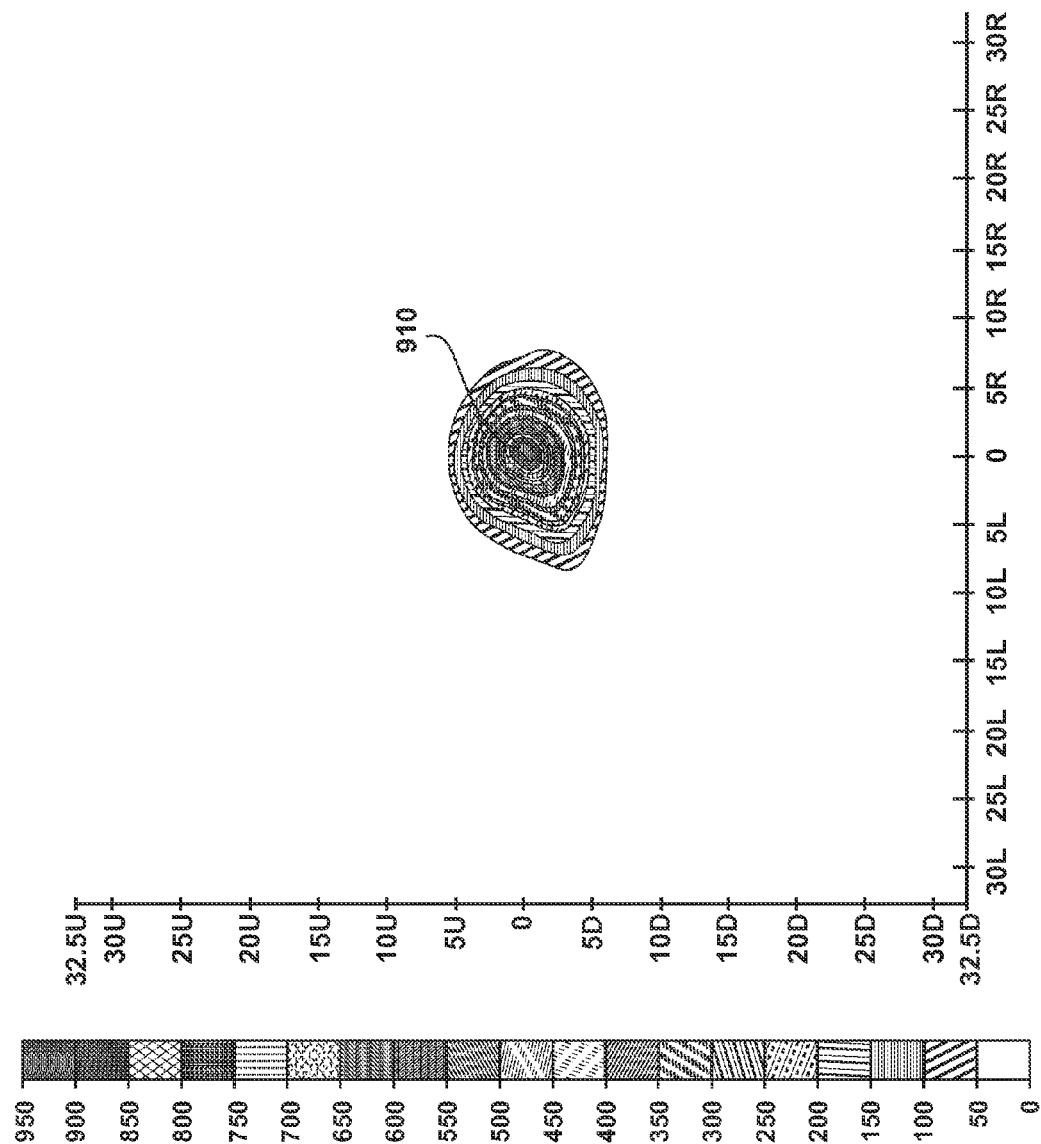
FIG. 9 is an isocandela plot of the output of the single active flanking LED and the end reflector in the light assembly of FIG. 5.

The revolved end reflector segment 22 is defined by an aspheric or conic curve that is revolved about an axis parallel to the Z-axis and that passes through the LED 26 and contributes to the overall effect of the reflector assembly 12 by contributing more intense illumination along the Z-axis 30. An isocandela plot as in FIG. 9 graphically represents the pattern of the light output from the single exterior LED 24 illuminating primarily through the end reflector segment 22 of the reflector assembly 12. The isocandela plot demonstrates a strong central intensity 910 on the optical axis. This intensity is a desirable characteristic because it makes the light assembly 10 appear brightest when viewed head-on.

Figure 10:
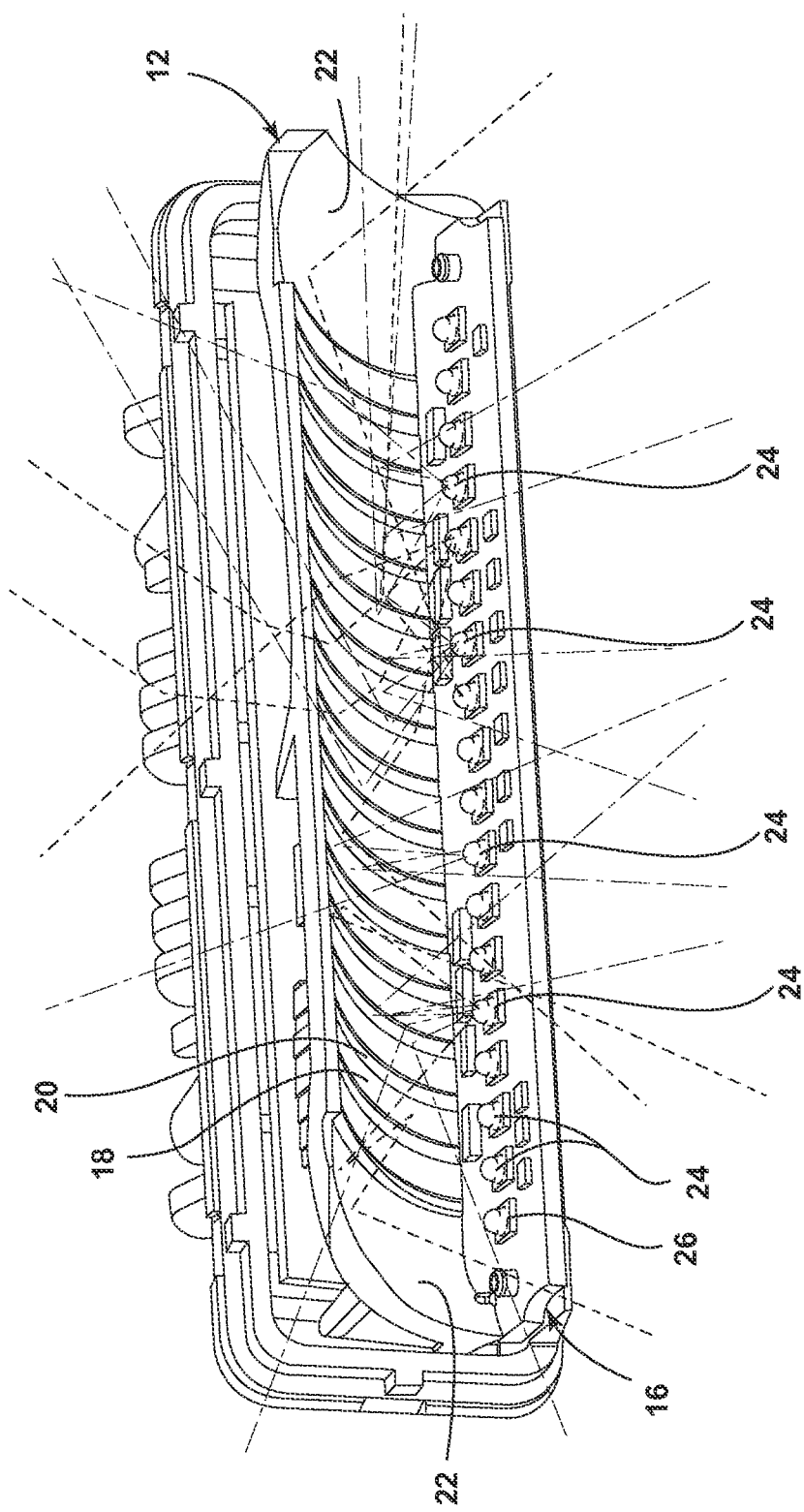
FIG. 10 is a perspective view of the light assembly of FIG. 1, including a ray-traced representation of light emitted from four interior LEDs interacting with the light assembly.
Figure 11:
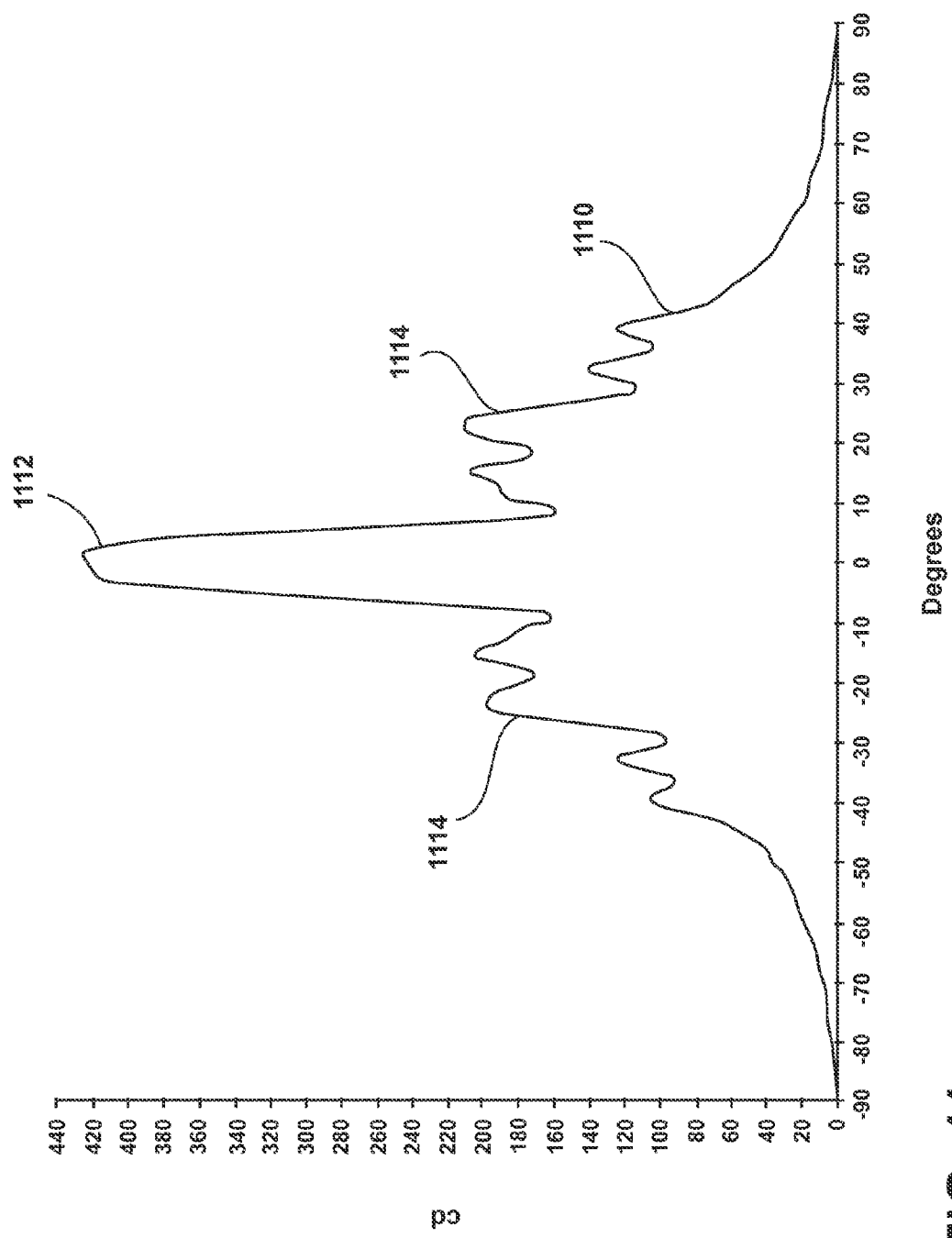
FIG. 11 is a candela distribution of the output in the horizontal plane of the four active interior LEDs in the light assembly of FIG. 10.

FIG. 10 is a perspective view of the light assembly of FIG. 1 that includes a representation of the geometrical ray tracing for a simulation where four interior LEDs 24 are active and illuminating for the light assembly 10. More LEDs 24 are activated for the simulation to determine the scalability of the light output. Assuming proper positioning of the LEDs in the LED array, it is expected that as more LEDs 24 are activated, light output intensity will increase and that light output pattern will be well-behaved. For the light assembly 10 of the present invention, a well-behaved and desirable light output pattern will show a strong light output directed from a horizontal orientation that projects a strong central intensity along the Z-axis 30 that extends radially out from the Z-axis 30 horizontally along the X-axis 28 regardless of the number of LEDs 24 activated. FIG. 11 is a candela distribution of the output in the horizontal plane for ray-tracing simulation of the light assembly 10 where four interior LEDs 24 are active and illuminating as shown in FIG. 10. This plot demonstrates the strong light intensity output 24 on the horizontal plane; that is the plane defined by the X-axis 28 and Z-axis 30. The light output is strongest at 1112 directly along the Z-axis 30 and modulates to lower intensity at 1114 radially outward from the Z-axis 30.

Figure 12:
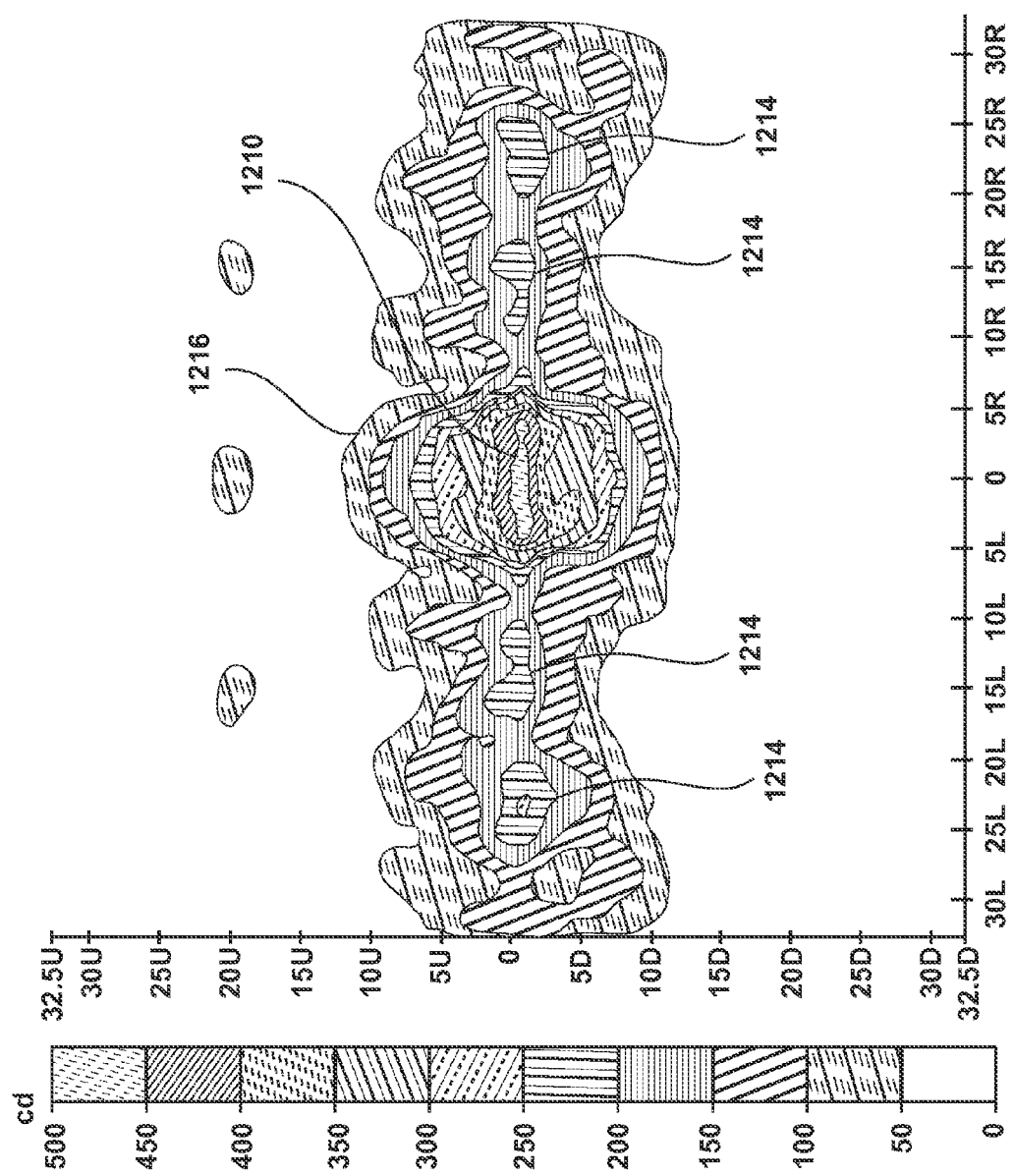
FIG. 12 is an isocandela plot of the output of the four active interior LEDs in the light assembly of FIG. 10.
Figure 13:
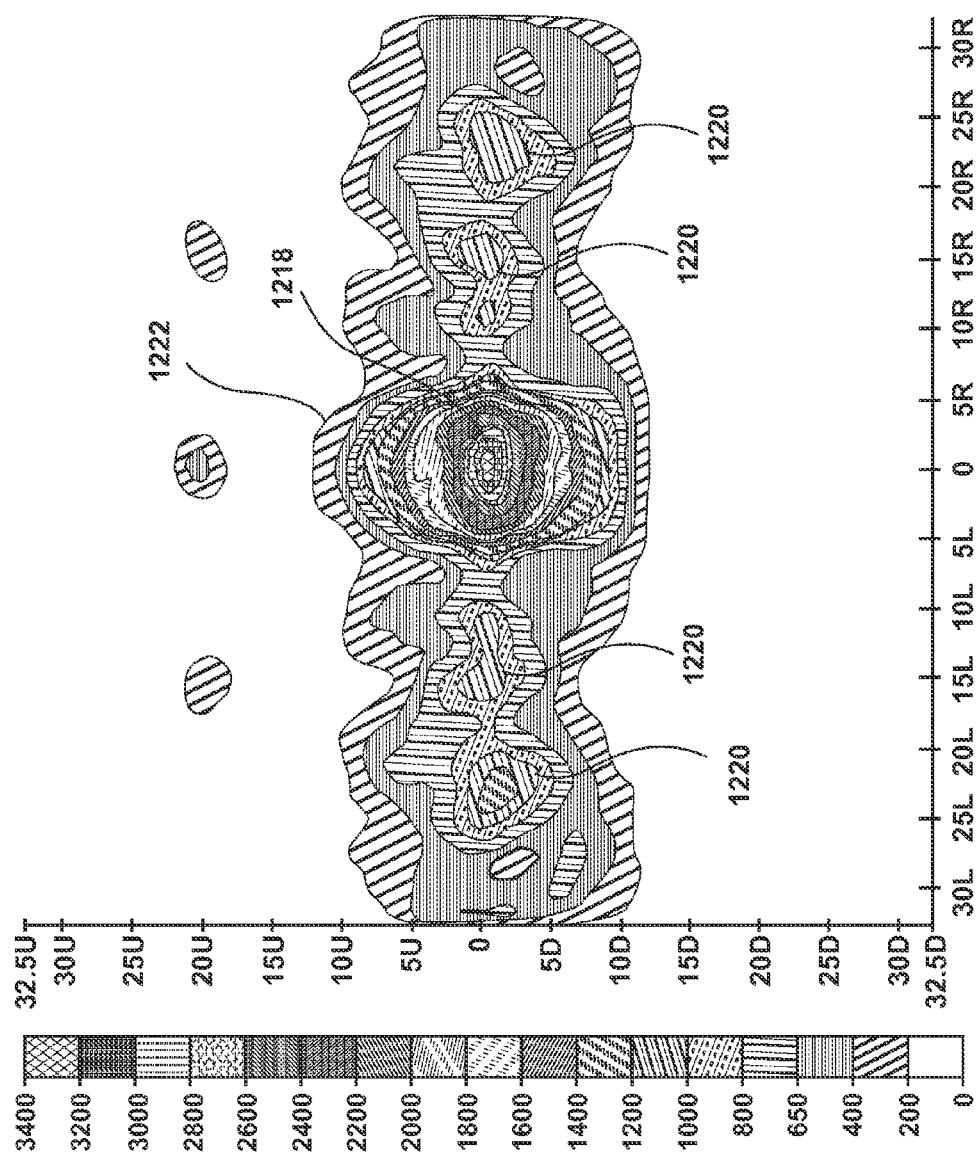
FIG. 13 is an isocandela plot of the output of the LED array in the light assembly of FIG. 1.

The isocandela plot shown in FIG. 12 demonstrates the strong intensity at 1210 along the Z-axis 30, the relatively wide horizontal spread of intensity at 1214 and the sharp vertical cutoff at 1216 when the four LEDs 24 are activated. The isocandela plot shown in FIG. 13 demonstrates the strong intensity at 1218 along the Z-axis 30, the relatively wide horizontal spread of intensity at 1220 and the sharp vertical cutoff at 1222 when the entire LED array 14 is activated. The overall beam pattern is more intense, or brighter, but the shape of the pattern remains stable as more LEDs are activated.

In other embodiments of the invention, the vertical surface profiles of the interior reflector segments 18, 20 are not limited to strictly parabolic profiles. However, for each embodiment of the invention, the interior reflector segments 18, 20 will have the same vertical surface profile that intersects a plane that is parallel to the coordinate plane formed from the Y-axis 32 and Z-axis 30 for a given embodiment. The end reflector segments 22 will be described by a single profile but may not be the same vertical profile as the interior segments.

Figure 14:
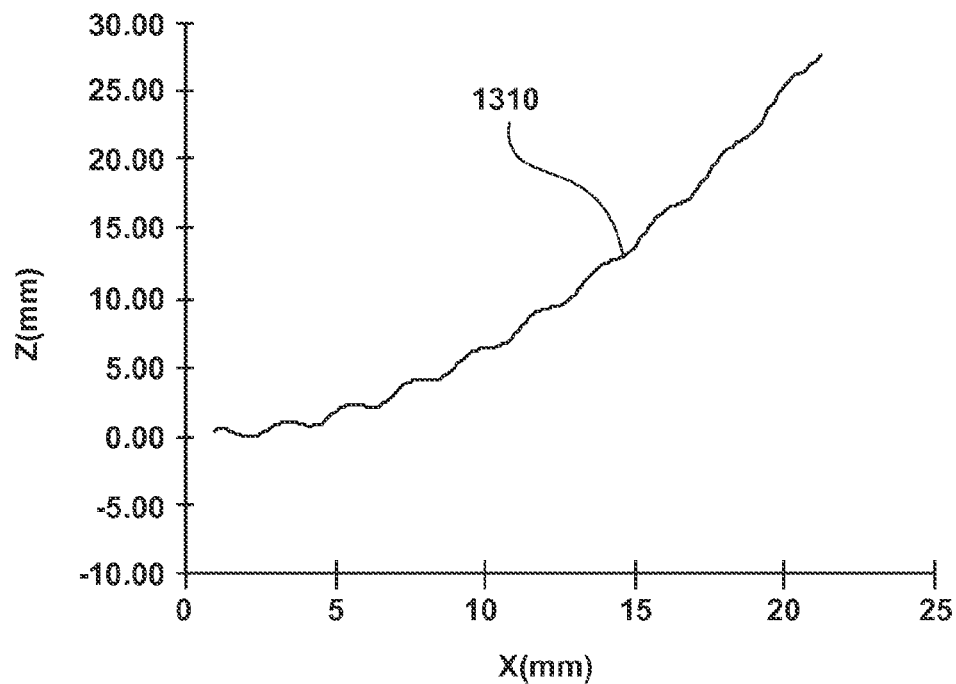
FIG. 14 is the profile of an aspheric surface modulated with a sinusoidal function for a reflector in accordance with an embodiment of the invention.
Figure 15:
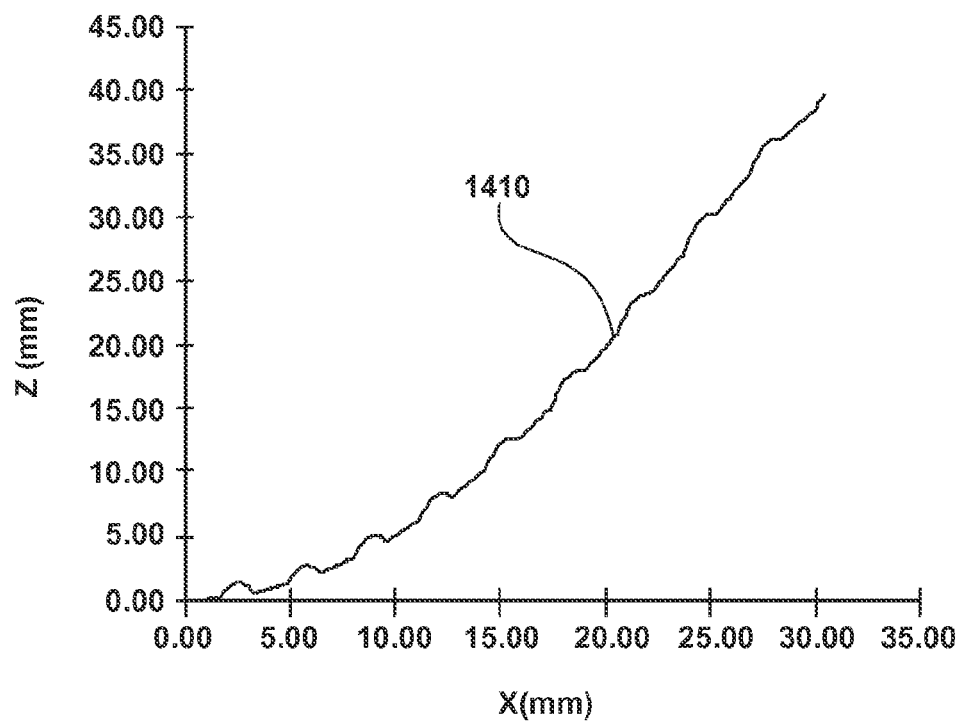
FIG. 15 is the profile of an aspheric surface modulated with a filtered sinusoidal function for a reflector in accordance with an embodiment of the invention.

As shown in FIGS. 14 and 15, the vertical surface profile of the reflector segments 18, 20, 22 will be aspheric or conic. A surface profile is aspheric or conic if it is not spherical or cylindrical. A common way to describe an aspheric or conic surface is given by the following equation:

$$z(x) = \frac{cx^2}{1 + \sqrt{1 - (1+k)c^2x^2}} + Ax^4 + Bx^6 + Cx^8 + Dx^{10} + Ex^{12} \ldots$$

where:

z is the aspheric or conic profile k is the conic coefficient x is the radial distance from the optical axis c is the curvature defined as the inverse of radius A, B, C, D, E . . . are the higher order aspheric coefficients The conic coefficient, k, determines the general shape of the profile. A conic coefficient of 0 indicates a spherical surface. An elliptical surface has a conic coefficient ranging from 0 to −1. A parabolic surface has a conic coefficient of −1. A hyperbolic surface has a conic coefficient less than −1.

The higher order coefficients of the aspheric or conic equation are similar in construction to a Taylor series expansion such as that which defines sinusoidal functions like sine and cosine. A Taylor series expansion of cosine is shown by the following equation:

$$\cos x = \sum_{n=0}^{\infty} \frac{-1^n}{(2n)!} x^{2n} = 1 - \frac{x^2}{2!} + \frac{x^4}{4!} - \frac{x^6}{6!} + \frac{x^8}{8!} - \ldots$$

The vertical surface profile may be described by one of many functions depending upon the implementation. The above-described examples for the aspheric equation and the Taylor series expansion of a cosine function are merely illustrative and should not be considered limiting. For example, the vertical surface profile may be described by a function with both even and odd exponents.

Embodiments of the reflector segments 18, 20 may include a surface profile 1310 formed by a paraboloid modulated with a sine wave as shown in FIG. 14. The sinusoidal function can be filtered to produce additional embodiments of the reflector segments 18, 20, 22 such as the parabolic surface shown in FIG. 15 modulated with the positive components of a sinusoidal function that produces a bumpy surface profile 1410.

Figure 16:
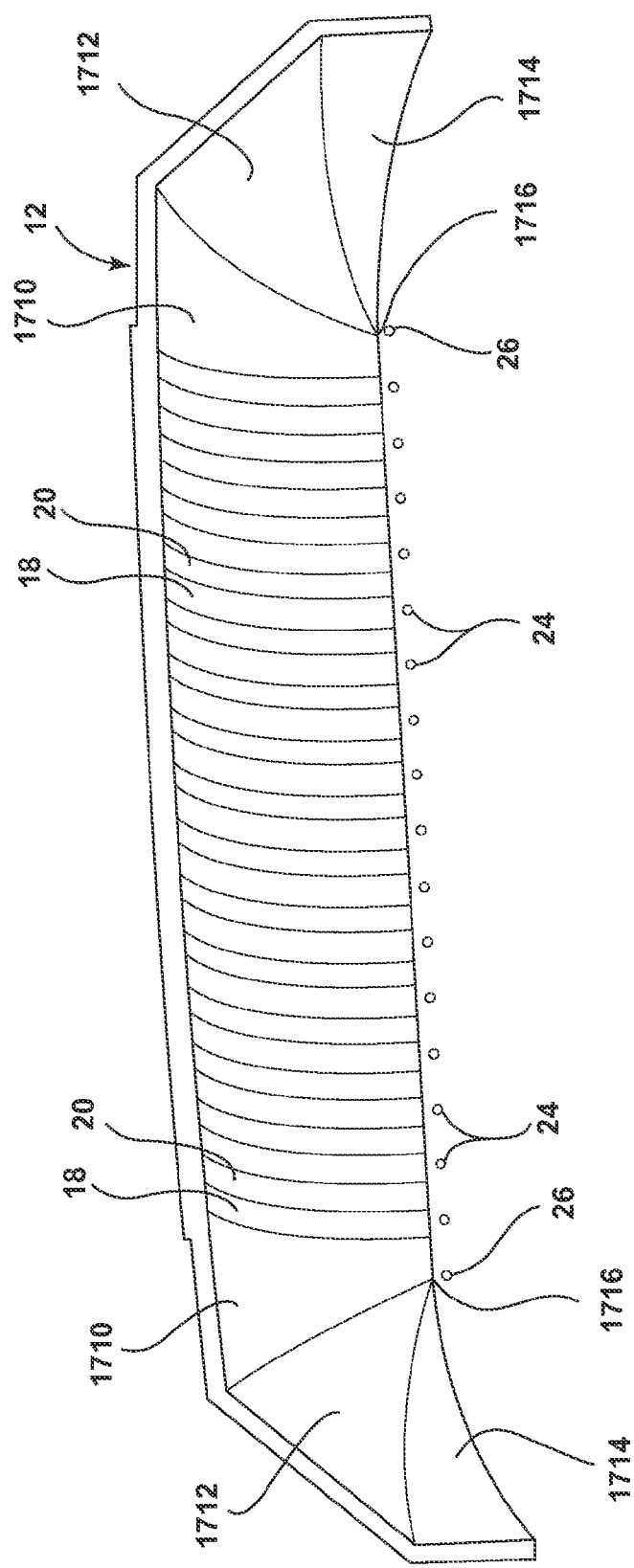
FIG. 16 is a perspective view of an additional embodiment of a light assembly according to the invention wherein the end reflector has a series of reflector segments that are swept about a common point at the intersection of the segments.

FIG. 16 is a perspective view of an additional embodiment of a light assembly according to the invention wherein the end reflector consists of a series of reflector segments 1710, 1712, 1714 that are defined by rotating a parabolic curve about a common point 1716 at the intersection of the segments.

Figure 17:
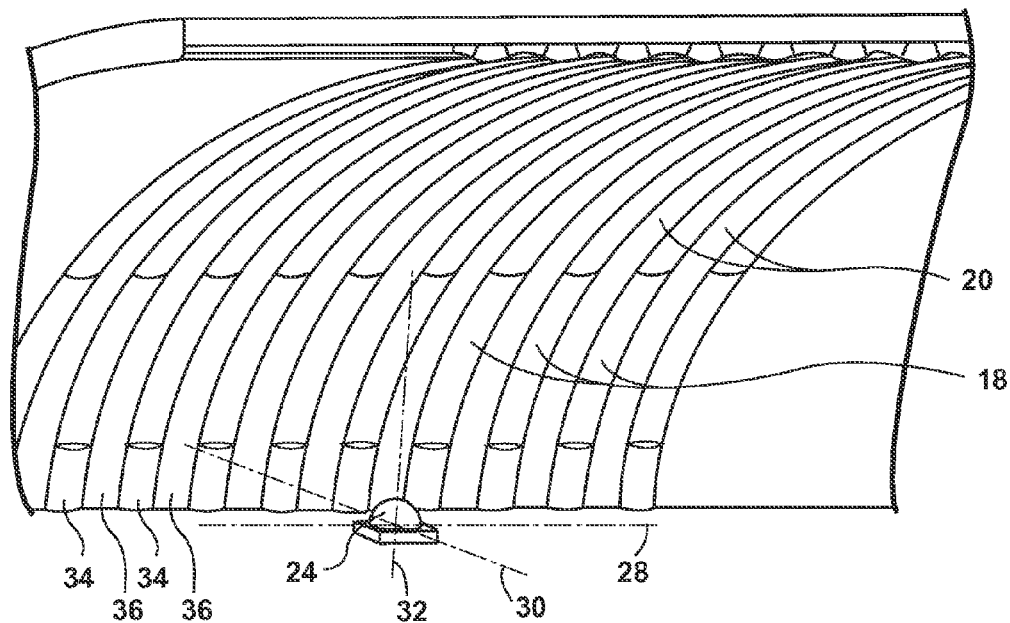
FIG. 17 is a perspective view of an additional embodiment of a light assembly according to the invention where the revolved concave reflector segments are placed vertically between revolved convex reflector segments.
Figure 18:
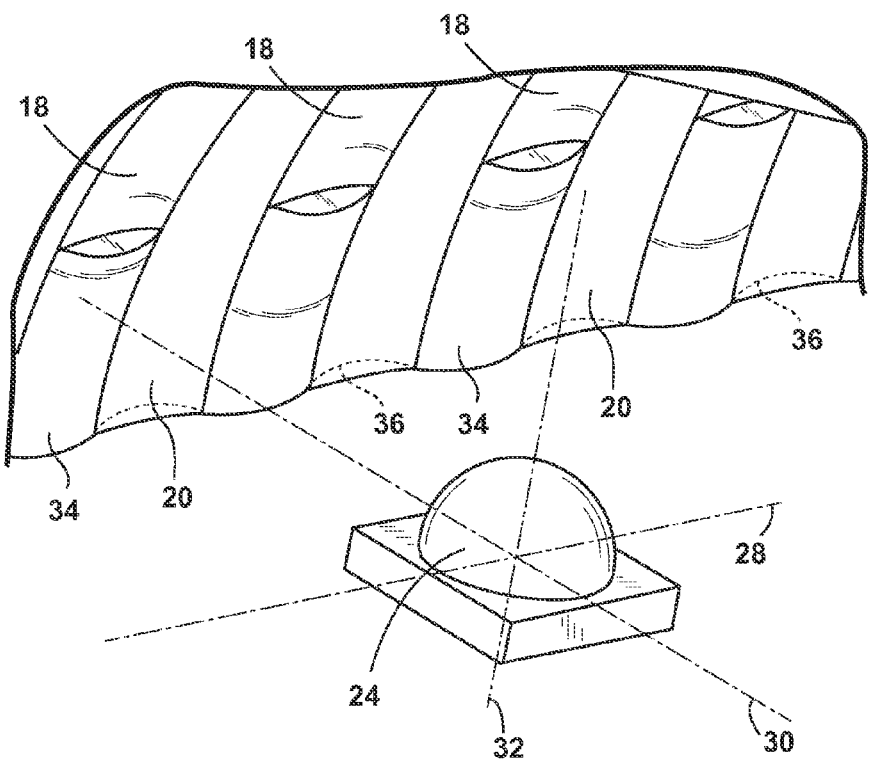
FIG. 18 is an enlarged partial perspective view of the light assembly of FIG. 18.

Referring to FIGS. 17 and 18, LEDs 24 are placed at the focal point of a reflector segment 18 that is revolved around the Z-axis 30. The vertical extent of the revolved segments 18 is limited to a length shorter than the height of the reflector assembly. Each revolved segment 18 is placed vertically to split a convex segment 34 that is defined by a sinusoidal function 36 along the X-axis parallel to the X-Z plane and defined vertically by the same aspheric or conic equation used for the previously described revolved 18 and linear 20 reflector segments.

As in previous embodiments, the revolved reflector segments 18 direct light substantially along the Z-axis 30 and the linear reflector segments 20 direct light substantially away from the Z-axis 30. Because of their convex shape, the additional segments 34 defined by the swept sinusoidal function 36 that are placed above and below the revolved segments 18 defocus the light from the LED and substantially spread light off of the Z-axis 30.

Figure 20:
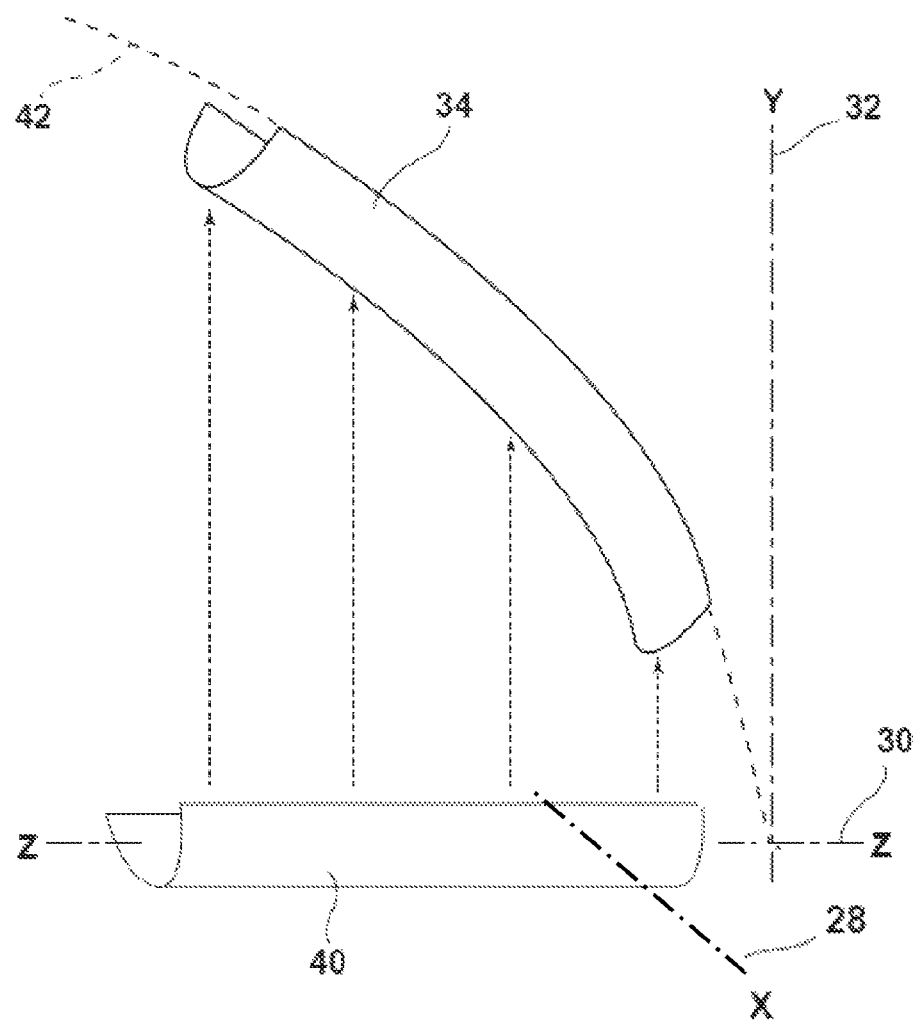
FIG. 20 is a diagrammatic view of a revolved section of the reflector, illustrating the geometry of a convex revolved section according to the invention.

Referring to FIG. 20, the convex segments 34 are shown as a curved facet 40 that is revolved around the Z-axis 30 such that the nadir of the curve is located at the intersection of the Z- and X-axes 28. The convex downward facet 40 is then projected up in the direction of the Y-axis 32 onto a curve 42 that is defined by an equation that preferably has its origin at the intersection of the Y-Z axes. The upward projection of the facet 34 is defined by a function 42 that forms the convex segment 34. As shown, the convex segment 34 has a vertical profile that follows a parabolic function 42. The convex segment 34 can be formed by projecting the curved facet 40 onto any aspheric function to define the vertical profile.

Figure 21:
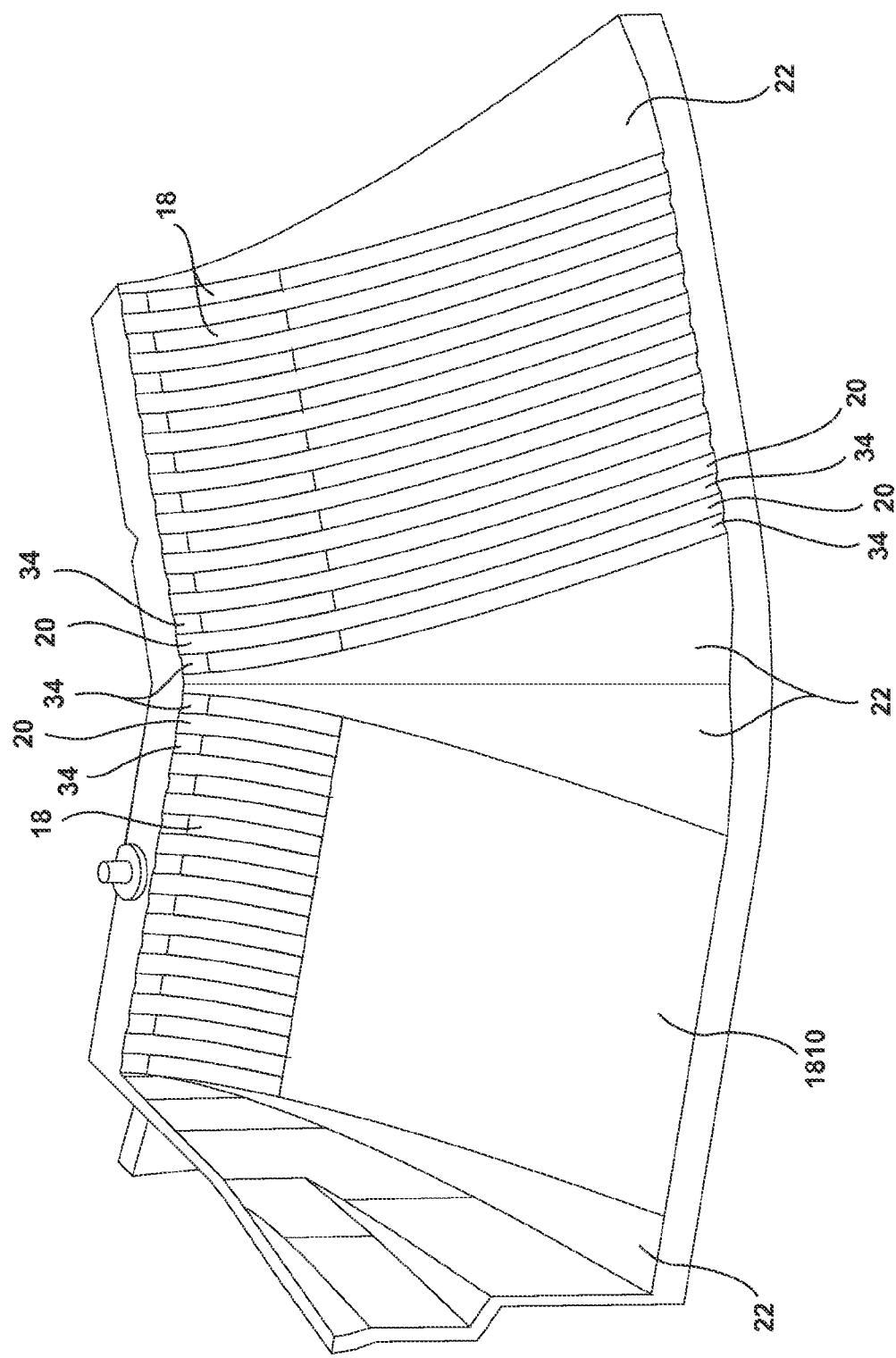
FIG. 21 is a perspective view of an additional embodiment of a light assembly according to the invention wherein multiple light assemblies 10 are juxtaposed.
Figure 22:
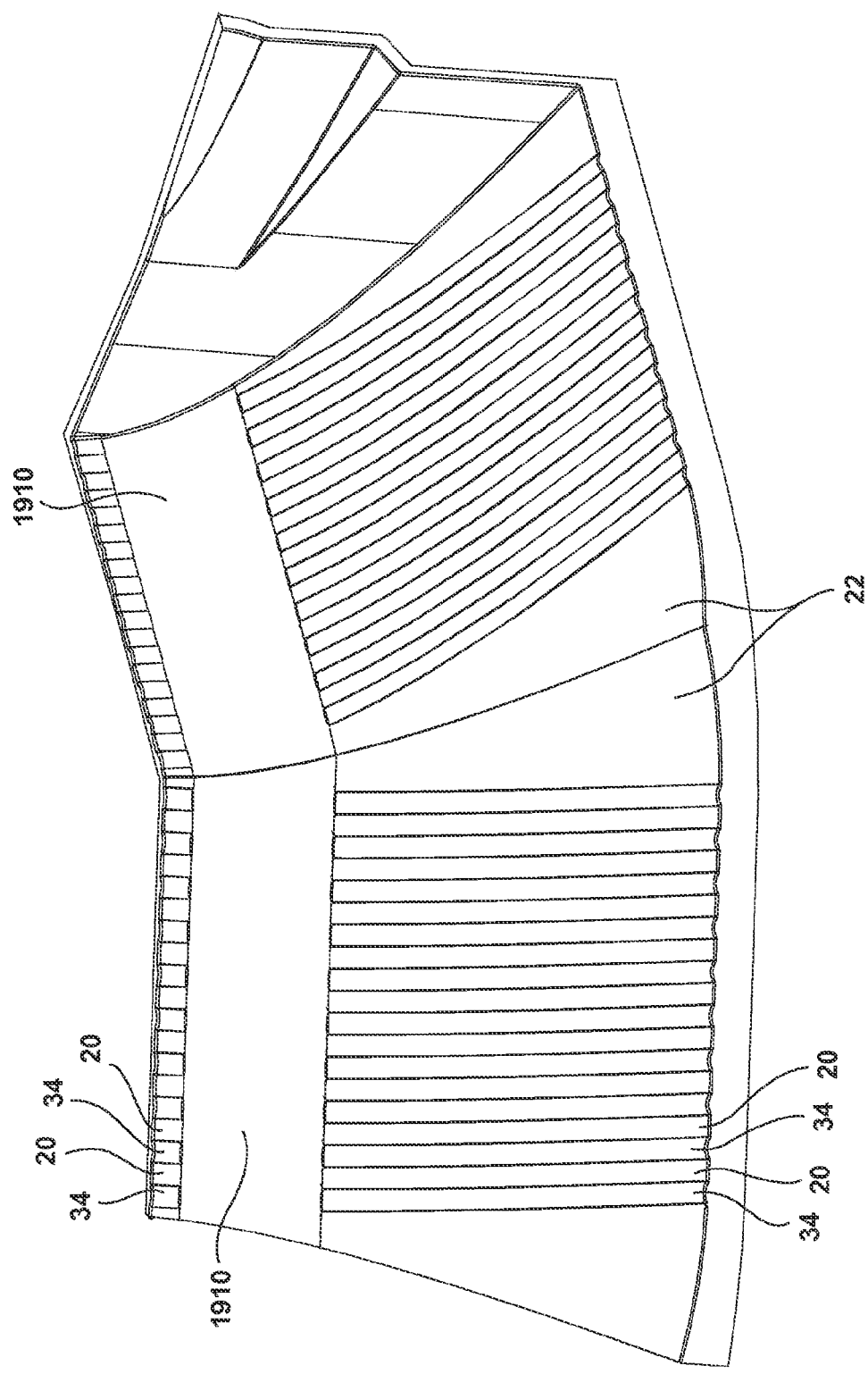
FIG. 22 is a perspective view of an additional embodiment of a light assembly according to the invention wherein multiple light assemblies 10 are juxtaposed.
Figure 23:
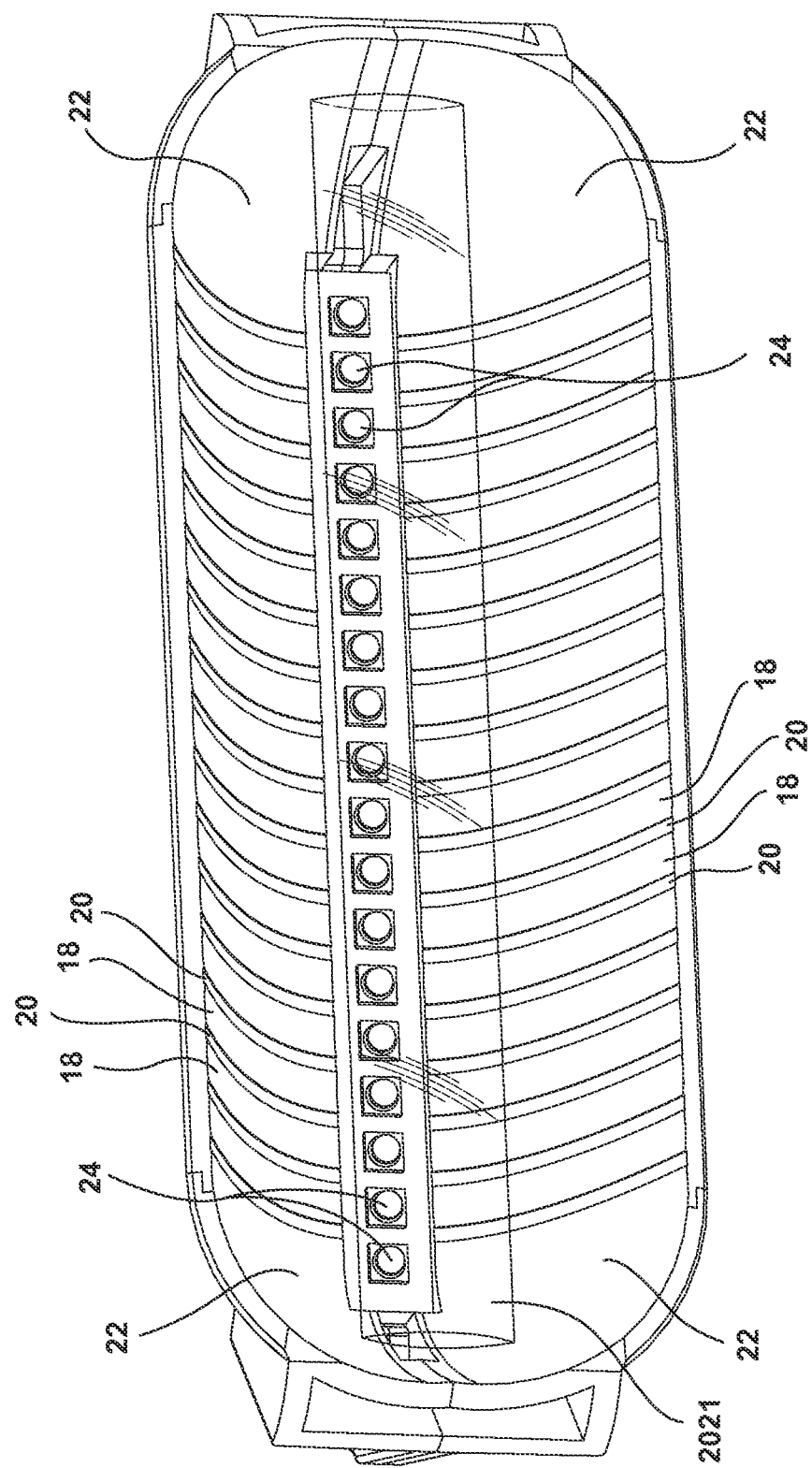
FIG. 23 is a perspective view of an additional embodiment of a light assembly according to the invention where the parabolic surfaces form a mirror-symmetrical curve with respect to the optical axis.

Multiple segments of the light assembly with a series of alternating linear and revolved concave or convex segments may be combined to form additional embodiments of the light assembly according to the present invention. The particular layout of the alternating linear and revolved segments may be identical or different among the light assembly segments depending upon the desired output light distribution. Similarly, the light assembly segments may be substantially parallel or configured about one or more axes of rotation. FIGS. 21-23 show several embodiments of the light assembly that includes the combination of light assembly segments. The particular embodiments shown in FIGS. 21-23 should not be considered limiting as they are intended to illustrate how the light assembly segments may be combined to produce an overall light assembly that can produce one of many desired output light distributions.

FIG. 21 is a perspective view of an additional embodiment of a light assembly according to the invention wherein multiple light assemblies are juxtaposed. Each section of the light assembly may include a series of alternating linear 20 and revolved parabolic concave and convex segments 18, 34 as previously described in FIGS. 17 and 18. The revolved end reflector segments 22 may be joined to form a continuous transition between the light assembly segments. The end reflector segments may be revolved or linear depending upon the relative orientation of the multiple light assemblies. In other words, the light assemblies may be juxtaposed such that each series of linear and revolved parabolic segments have unique common axes or each light assembly may be joined to form a long linear light assembly with a parallel common axis. Preferably, each light assembly segment may be joined where the end reflector segment 22 of a first light assembly segment intersects with the end reflector segment 22 of a second light assembly.

Additionally, linear parabolic segments 1810 may be integrated into the light assembly that share the same common axis as the alternating linear 20 and revolved parabolic concave and convex segments 18, 34 but with widths substantially different from the series of alternating parabolic segments. As shown, the long linear parabolic segment 1810 is equal in width to the entire series of alternating linear 20 and revolved parabolic concave and convex segments 18, 34, but other widths are contemplated. While the light assembly in FIG. 21 shows two light assembly segments juxtaposed, other numbers of light assembly segments are contemplated. For example, six segments may be joined such that the optical axes of the six segments substantially cover 180 degrees. In other words, a light assembly segment at one end of the overall light assembly has an optical axis rotated 180 degrees from the light assembly segment at the opposite end of the overall light assembly.

FIG. 22 is a perspective view of an additional embodiment of a light assembly according to the invention wherein multiple parabolic light assemblies are juxtaposed. Long linear parabolic segments 1910 are in place of the alternating series of linear 20 and revolved parabolic concave segments 18 shown in FIG. 21. The long linear parabolic segments 1910 provide a geometry that will advantageously direct a distribution of light away from the optical axis. Other placements of linear parabolic segments are contemplated and may be implemented depending upon the desired pattern of light with respect to the optical axis.

FIG. 23 is a perspective view of an additional embodiment of a light assembly according to the invention where the parabolic surfaces form a mirror-symmetrical curve with respect to the plane composed of both the optical axis and the common axis. Each light assembly segment includes a series of alternating linear 20 and revolved parabolic 18 segments but are now joined in opposition and share the common axis. Additionally, the light from the LEDs is aimed along the axes of the parabolas and not perpendicular to parabolic axes and may further be directed by an optical element 2021 as previously described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An emergency vehicle light fixture comprising:
an elongated body having an optical axis and a continuous reflective surface formed by a series of alternating linear and revolved parabolic segments that are coextensive along the height of the reflective surface, each of which has a focal point that lies along a common axis that is orthogonal to the optical axis,
wherein the elongated body extends parallel to the common axis, and
wherein the alternating linear and revolved parabolic segments are joined at edges and alternated in a direction parallel to the common axis.

2. The emergency vehicle light fixture of claim 1 and further comprising an LED positioned at the focal point of one or more revolved parabolic segments.

3. The emergency vehicle light fixture of claim 1 wherein the revolved parabolic segments are concave with respect to the optical axis in orthogonal cross-section.

4. The emergency vehicle light fixture according to claim 3 and further comprising an LED positioned at the focal point of one or more linear and revolved parabolic segments and further comprising an optical element that is positioned and configured to direct light rays emanating from the LED and not reflected by the reflective surface.

5. The emergency vehicle light fixture according to claim 3 and further comprising an LED positioned at the focal point of one or more linear and revolved parabolic segments wherein the output axis of the LEDs are positioned at an acute angle with respect to the axis orthogonal to the common axis and the optical axis.

6. The emergency vehicle light fixture according to claim 5 wherein the acute angle is greater than 0 degrees and less than 15 degrees.

7. The emergency vehicle light fixture according to claim 5 wherein the acute angle is greater than 8 degrees and less than 12 degrees.

8. The emergency vehicle light fixture according to claim 5 wherein the acute angle is about 10 degrees.

9. The emergency vehicle light fixture of claim 1 wherein the revolved parabolic segments are convex with respect to the optical axis in orthogonal cross-section.

10. The emergency vehicle light fixture of claim 1 further comprising revolved end reflector segments that flank the series of linear and revolved reflector segments.

11. The emergency vehicle light fixture of claim 10 further comprising LEDs positioned at each of the focal points of the revolved end reflector segments.

12. The emergency vehicle light fixture of claim 1 wherein the revolved parabolic segments are defined by partial revolution of a line around the optical axis and then projected orthogonally to the optical and common axis onto a curve that is defined by a parabolic function wherein the focus of the curve is located at the intersection of the optical and common axes.

13. The emergency vehicle light fixture of claim 12 wherein the focus of the parabolic function is located at the locus of the effective output of an LED.

14. The emergency vehicle light fixture of claim 1 wherein the revolved parabolic segments are defined by a parabolic curve that is modulated with a complex function.

15. The emergency vehicle light fixture of claim 14 wherein the complex function is convex.

16. The emergency vehicle light fixture of claim 14 wherein the complex function is concave.

17. The emergency vehicle light fixture of claim 14 wherein the complex function of at least one of the revolved parabolic segments is convex along a portion of the at least one of the revolved parabolic segments and concave along another portion of the at least one of the revolved parabolic segments.

18. The emergency vehicle light fixture of claim 1 wherein the linear parabolic segments are linear with respect to the optical axis in orthogonal cross-section.

19. The emergency vehicle light fixture of claim 1 further comprising revolved end reflector segments that flank the series of linear and revolved reflector segments wherein the revolved end reflector segments comprise a series of reflector segments that are defined by rotating a parabolic curve about a common point at the intersection of the end reflector segments.

20. The emergency vehicle light fixture according to claim 1 wherein the linear and revolved parabolic segments have a common parabolic function.

21. The emergency vehicle light fixture according to claim 20 wherein the common parabolic function is one of aspheric and conic.

22. The emergency vehicle light fixture according to claim 1 wherein at least some of the linear and revolved parabolic segments have a parabolic function that is modulated with a complex function.

23. The emergency vehicle light fixture according to claim 1 wherein the parabolic surfaces form a mirror-symmetrical curve with respect to the plane composed of the optical axis and the common axis.

* * * * *